(12) United States Patent
Yamada et al.

(10) Patent No.: US 11,492,100 B2
(45) Date of Patent: Nov. 8, 2022

(54) INFORMATION PROCESSING APPARATUS

(71) Applicant: NTT DOCOMO, INC., Tokyo (JP)

(72) Inventors: Takefumi Yamada, Tokyo (JP); Ken Koumoto, Tokyo (JP); Hidetoshi Ebara, Tokyo (JP); Youhei Oono, Toyko (JP); Yuichiro Segawa, Tokyo (JP); Yukiko Nakamura, Toyko (JP)

(73) Assignee: NTT DOCOMO, INC., Tokyo (JP)

( * ) Notice: Subject to any disclaimer, the term of this patent is extended or adjusted under 35 U.S.C. 154(b) by 309 days.

(21) Appl. No.: 16/644,679

(22) PCT Filed: Jul. 24, 2018

(86) PCT No.: PCT/JP2018/027707
§ 371 (c)(1),
(2) Date: Mar. 5, 2020

(87) PCT Pub. No.: WO2019/054056
PCT Pub. Date: Mar. 21, 2019

(65) Prior Publication Data
US 2020/0283128 A1  Sep. 10, 2020

(30) Foreign Application Priority Data
Sep. 15, 2017  (JP) .............................. JP2017-177651

(51) Int. Cl.
*B64C 39/02*  (2006.01)
*G08G 5/00*  (2006.01)
(Continued)

(52) U.S. Cl.
CPC ............ *B64C 19/02* (2013.01); *B64C 39/024* (2013.01); *G08G 5/0034* (2013.01); *G08G 5/0043* (2013.01); *B64C 2201/143* (2013.01)

(58) Field of Classification Search
CPC . B64C 19/02; B64C 39/024; B64C 2201/143; B64C 19/00; B64C 39/02;
(Continued)

(56) References Cited

U.S. PATENT DOCUMENTS

| | | | |
|---|---|---|---|
| 2002/0011950 A1 | 1/2002 | Frazier et al. | |
| 2016/0156406 A1* | 6/2016 | Frolov | ............... H04B 7/18504 455/431 |

(Continued)

FOREIGN PATENT DOCUMENTS

| | | |
|---|---|---|
| JP | 2005140795 A | 6/2005 |
| JP | 2017062724 A | 3/2017 |

OTHER PUBLICATIONS

International Search Report issued in corresponding PCT Application No. PCT/JP2018/027707, dated Oct. 19, 2018, 4 pages.

(Continued)

*Primary Examiner* — Yonel Beaulieu
(74) *Attorney, Agent, or Firm* — Dilworth IP, LLC

(57) ABSTRACT

An information apparatus includes a schedule obtainment unit that obtains flight schedule information transmitted from terminals. Allocation unit allocates an airspace and a permitted flight period to drone based on the obtained flight schedule information. If there is a predetermined commonality in the airspaces and the flight directions of multiple drones, allocation unit causes those multiple drones to share the airspace under the condition that formation flight in which distances therebetween are controlled is performed. Allocation unit determines an arrangement in which multiple drones are aligned in the order in which drones withdraw from formation flight as the arrangement of multiple drones during formation flight. Also, allocation unit determines an arrangement in which drone that does not include (Continued)

a formation flight function is in front and drone that includes formation flight function follows therebehind.

18 Claims, 7 Drawing Sheets

(51) Int. Cl.
  *G05D 1/00* (2006.01)
  *B64C 19/02* (2006.01)
(58) Field of Classification Search
  CPC .. G08G 5/0034; G08G 5/0043; G08G 5/0021; G08G 5/006; G08G 5/0069; G08G 5/0013; G08G 5/00; G08G 5/0026; G05D 1/00
  See application file for complete search history.

(56) References Cited

U.S. PATENT DOCUMENTS

| | | | | |
|---|---|---|---|---|
| 2018/0253978 A1* | 9/2018 | Tabuchi | ............... | G08G 5/0034 |
| 2018/0293898 A1* | 10/2018 | Redmann | ............. | G08G 5/0013 |
| 2020/0365039 A1* | 11/2020 | Yamada | ................ | G08G 5/045 |
| 2022/0066443 A1* | 3/2022 | Kuhlman | ............. | G08G 5/0069 |
| 2022/0076583 A1* | 3/2022 | Gu | ...................... | G08G 5/0047 |

OTHER PUBLICATIONS

Notice for Reasons for Refusal issued in corresponding Japanese Patent Application No. 2019-541937, dated Mar. 2, 2021.

\* cited by examiner

| DRONE ID | DEPAR-TURE POINT | TRAN-SIT POINT | DESTI-NA-TION | ESTIMA-TED DEPAR-TURE TIME | ESTIMA-TED ARRIVAL TIME | FORMA-TION FLIGHT FUNCTION |
|---|---|---|---|---|---|---|
| D001 | WARE-HOUSE α1 | INTER-SEC-TION β1 | SHOP γ1 | T1 | T2 | INCLUDED |
| D002 | PORT α2 | INTER-SEC-TION β2 | BUILD-ING γ2 | T3 | T4 | INCLUDED |

| CELL ID | COORDINATES OF CENTER | LENGTH OF ONE SIDE | CAPABILITY OF FLIGHT |
|---|---|---|---|
| C01_01 | x1,y1,z1 | L1 | ○ |
| C02_01 | x2,y1,z1 | L1 | ○ |
| ... | ... | ... | ... |
| C99_99 | x99,y99,z1 | L1 | × |

| DRONE ID | FLIGHT AIRSPACE (CELL ID) | PERMITTED FLIGHT PERIOD | FORMATION FLIGHT FUNCTION |
|---|---|---|---|
| D001 | R11(C0101,C0201,··,C2001) | K11(T111~T112) | INCLUDED |
| | R12(C2001,C2002,··,C2020) | K12(T121~T122) | |
| | R13(C2020,C2120,··,C4320) | K13(T131~T132) | |
| D002 | R21(C4005,C3905,··,C2005) | K21(T211~T212) | INCLUDED |
| | R22(C2005,C2006,··,C2015) | K22(T221~T222) | |
| | R23(C2015,C1915,··,C0515) | K23(T231~T232) | |
| | R24(C0515,C0516,··,C0530) | K24(T241~T242) | |

| DRONE ID | FLIGHT AIRSPACE | PERMITTED FLIGHT PERIOD | MERGING CELL | MERGING TIME | ALIGNMENT ORDER IN FORMATION FLIGHT |
|---|---|---|---|---|---|
| D001 | R11(··) | K11(··) | C20_05 | TG1 | 1 |
|  | R12(··) | K12(··) |  |  |  |
|  | R13(··) | K13(··) | C20_10 | TG2 | 1 |
| D002 | R21(··) | K21(··) | C20_05 | TG1 | 2 |
|  | R22(··) | K22(··) |  |  |  |
|  | R23(··) | K23(··) | C20_10 | TG2 | 3 |
|  | R24(··) | K24(··) |  |  |  |
| D003 | R31(··) | K31(··) | C20_10 | TG2 | 2 |
|  | R32(··) | K32(··) |  |  |  |
|  | R33(··) | K33(··) |  |  |  |
|  | R34(··) | K34(··) |  |  |  |

| DESTINA-TION COORDI-NATES | FLIGHT ALTI-TUDE | FLIGHT DIRE-CTION | FLIGHT SPEED | SPATIAL WIDTH OF FLIGHT AIRSPACE | TARGET ARRIVAL TIME | ALIGNMENT ORDER / NUMBER OF DRONES IN FORMATION FLIGHT |
|---|---|---|---|---|---|---|
| P1 | 0~A1 | — | — | — | T111'~ | — |
| P2 | | EASTWARD | V1 | L1,L1,L1 | T121'~T112' | — |
| P3 | | SOUTHWARD | V1 | L1,L1,L1 | ~TG1 | — |
| P4 | | SOUTHWARD | V1 | L1,L1,L1 | ~TG2 | 1/2 |
| P5 | A1 | SOUTHWARD | V1 | L1,L1,L1 | T231'~ | 1/3 |
| P6 | | SOUTHWARD | V1 | L1,L1,L1 | T131'~T122' | 1/2 |
| P7 | | EASTWARD | V1 | L1,L1,L1 | T341'~ | 1/2 |
| P8 | | EASTWARD | V1 | L1,L1,L1 | ~T132' | — |
| P9 | A1~0 | — | — | — | — | — |

INFORMATION PROCESSING APPARATUS

TECHNICAL FIELD

The present invention relates to a technique for allocating airspace to an aerial vehicle.

BACKGROUND

Techniques for allocating airspace to an aerial vehicle are known. For example, Japanese Patent Application No. JP 2017-62724A discloses a technique that provides an air route along which an unmanned aerial vehicle flies, the air route being located in a space higher than the tops of electrical wire poles with respect to the vertical direction and having a cross-sectional shape defined by a width determined based on the shapes of the electrical wire poles.

SUMMARY OF INVENTION

As the use of aerial vehicles such as drones becomes more common, it is envisioned that airspace is allocated to the aerial vehicle. This allocation is required to achieve balance between safety and convenience. For example, if it is expected that aerial vehicles that fly in the same direction will approach each other, simply allocating separate airspaces in order to ensure safety will result in decreased convenience, such as allocatable airspaces being depleted and flight not being possible at a desired time.

In view of this, the present invention aims to safely and effectively use airspace even if it is expected that aerial vehicles that fly in the same direction will approach each other.

In order to achieve the above-described object, the present invention provides an information processing apparatus that includes: an obtainment unit configured to obtain schedule information indicating a flight schedule of an aerial vehicle; and an allocation unit configured to allocate an airspace to the aerial vehicle based on the obtained schedule information, and if there is a predetermined commonality in airspaces and flight directions for a plurality of aerial vehicles, cause the plurality of aerial vehicles to share the airspace under a condition that formation flight is performed.

Moreover, the allocation unit may also increase the size of a cross-section of the airspace the greater the number of aerial vehicles that are to perform the formation flight is.

Furthermore, the information processing apparatus may also include a determination unit configured to determine an arrangement of the plurality of aerial vehicles that are to perform the formation flight.

Moreover, the information processing apparatus may also include a function obtainment unit configured to obtain function information indicating whether or not an aerial vehicle includes a function of performing formation flight. Based on the obtained function information, the determination unit may also determine an arrangement in which an aerial vehicle that does not include the function is in front and an aerial vehicle that includes the function follows therebehind.

Furthermore, the determination unit may also determine an arrangement in which the plurality of aerial vehicles are aligned in an order in which the aerial vehicles withdraw from the formation flight.

Moreover, the information processing apparatus may also include a speed obtainment unit configured to obtain speed information indicating a flight speed of the aerial vehicle. The determination unit may also determine an arrangement in which the plurality of aerial vehicles are aligned from the front in order starting from the aerial vehicle with the slowest flight speed indicated by the obtained speed information.

Furthermore, the information processing apparatus may also include a size obtainment unit configured to obtain size information indicating the size of the aerial vehicle. The determination unit may also determine an arrangement in which the plurality of aerial vehicles are aligned from the front in order starting from the aerial vehicle with the largest size indicated by the obtained size information.

Moreover, the allocation unit allocates the airspace and a permitted flight period during which flight in the airspace is allowed, and if aerial vehicles that are to perform formation flight are to fly at a speed matching a speed of an aerial vehicle with the slowest flight speed, the allocation unit extends the permitted flight period according to a delay that results from the formation flight.

According to the present invention, it is possible to safely and effectively use airspace even when it is expected that aerial vehicles that fly in the same direction will approach each other.

DETAILED DESCRIPTION

The following describes an embodiment of the present invention with references to the drawings.

Figure 1:
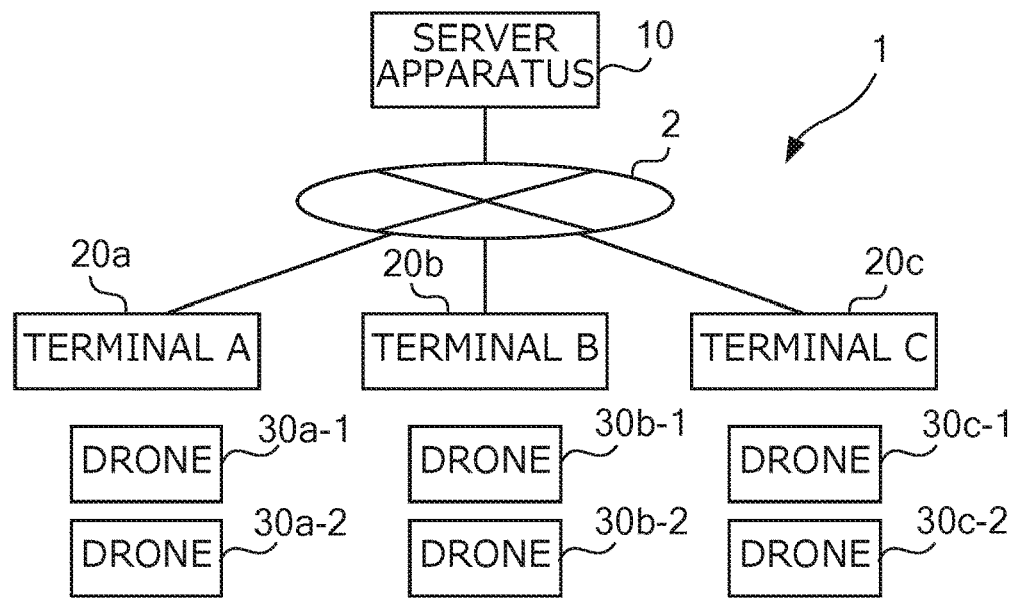
FIG. 1 is a diagram illustrating the overall configuration of a drone operation management system according to an embodiment, in accordance to the present invention.

FIG. 1 shows an overall configuration of drone operation management system 1 according to the embodiment. Drone operation management system 1 is a system that manages operations of a drone. "Operation management" refers to managing flight of an aerial vehicle (aircraft) such as a drone based on a flight plan. In, for example, an environment in which multiple drones are flying, drone operation management system 1 supports the safe and smooth flight of the drones by allocating airspace to the drones and making instructions pertaining to the flight to the drones (flight instructions).

A "drone" is an aerial vehicle that is capable of flying in accordance with a flight plan and that is typically unmanned, and is an example of an "aerial vehicle" according to the present invention. Drones are mainly used by companies operating transport, filming, and surveillance businesses, for example. Although the present embodiment describes unmanned drones as the subject of the operation management, manned drones also exist, and manned drones may therefore also be subject to the operation management. Regardless of whether or not drone operation management system 1 handles manned aerial vehicle, a scope of management for carrying out control in which the airspace of manned craft such as airplanes is ascertained and flight instructions or the like are issued may be included in the operation management carried out by drone operation management system 1.

Drone operation management system 1 includes network 2, server apparatus 10, A terminal 20a, B terminal 20b, C terminal 20c (called "terminals 20" when there is no need to distinguish between them), A business drones 30a-1 and 30a-2, B business drones 30b-1 and 30b-2, and C business drones 30c-1 and 30c-2 (called "drones 30" when there is no need to distinguish between them).

Network 2 is a communication system including a mobile communication network, the Internet, and the like, and relays the exchange of data between devices accessing that system. Network 2 is accessed by server apparatus 10 and terminals 20 through wired communication (or wireless communication), and by drones 30 through wireless communication.

Terminals 20 are terminals used by, for example, operation managers of drones 30 in the respective businesses. Terminals 20 generate flight schedules specifying overviews of flights planned by drones 30 through operations made by the operation managers, and transmit the generated flight schedules to server apparatus 10. A flight schedule is, for example, information indicating a departure point, a transit point of needed), a destination, an estimated departure time, an estimated arrival time, and the like.

Server apparatus 10 is an information processing apparatus for performing processing relating to the above-described flight instruction. Server apparatus 10 allocates airspaces and permitted flight periods to drones 30 based on the received flight schedule. Airspace is information indicating a space through which drone 30 is to pass when flying from a departure point to a destination, and the permitted flight period is information indicating a period for which flight is permitted in the allocated airspace. Server apparatus 10 creates flight instructions instructing drone 30 to fly in the allocated airspace for the allocation permitted flight period, and transmits the created flight instructions to terminal 20.

Terminal 20 generates flight control information, which is parameters by which drone 30 controls its own flight, based on the received flight instructions, and transmits the generated flight control information to the target drone 30. Although the parameters used by drone 30 to control the flight differ depending on the specifications of the program that controls drone 30, flight altitude, flight direction, flight speed, spatial coordinates of the point of arrival, and the like are used, for example.

Drone 30 is an aerial vehicle that flies autonomously or according to a flight plan, and in the present embodiment, is a rotary-wing aerial vehicle that includes one or more rotors and flies by rotating those rotors. All drones 30 include a coordinate measurement function for measuring the position and altitude of that drone 30 (i.e., spatial coordinates in a three-dimensional space) and a time measurement function for measuring time, and can fly within the airspace and permitted flight period specified by the flight instructions by controlling the flight speed and flight direction while measuring the spatial coordinates and the time.

Figure 2:
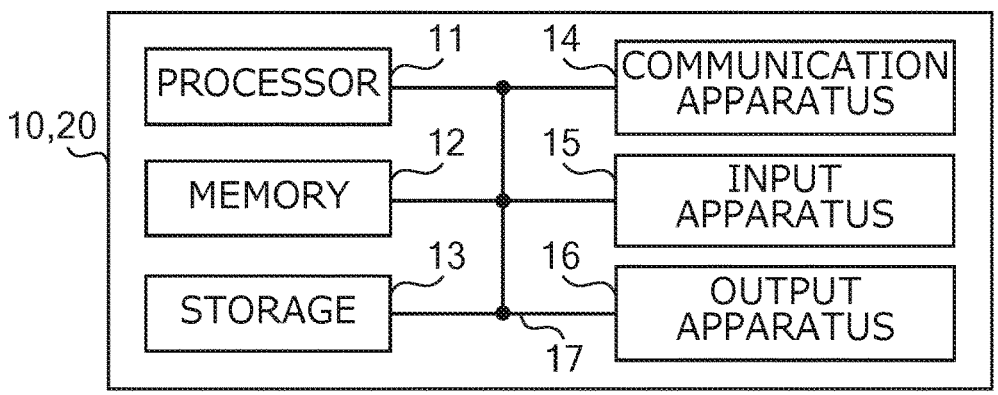
FIG. 2 is a diagram illustrating the hardware configuration of a server apparatus and the like, in accordance to the present invention.

FIG. 2 is a diagram illustrating the hardware configuration of server apparatus 10 and the like. Server apparatus 10 and the like (server apparatus 10 and terminal 20) are both computers that include the following apparatuses, namely processor 11, memory 12, storage 13, communication unit 14, input unit 15, output unit 16, and bus 17. The term "apparatus" used here can be replaced with "circuit", "device", "unit", or the like. One or more of each apparatus may be included, and some apparatuses may be omitted.

Processor 11 controls the computer as a whole by running an operating system, for example. Processor 11 may be constituted by a central processing unit (CPU) including an interface with peripheral apparatuses, a control apparatus, a computation apparatus, registers, and the like. Additionally, processor 11 reads out programs (program code), software modules, data, and the like from storage 13 and/or communication unit 14 into memory 12, and then executes various types of processes in accordance therewith.

There may be one, or two or more, processors 11 that execute the various types of processes, and two or more processors 11 may execute various types of processes simultaneously or sequentially. Processor 11 may be provided as one or more chips. The programs may be transmitted from a network over an electrical communication line.

Memory 12 is a computer-readable recording medium, and may be constituted by at least one of ROM (Read Only Memory), EPROM (Erasable Programmable ROM), EEPROM (Electrically Erasable Programmable ROM), RAM (Random Access Memory), and so on, for example. Memory 12 may be called a "register", "cache", "main memory" (a main storage apparatus), or the like. Memory 12 can store the aforementioned programs (program code), software modules, data, and the like.

Storage 13 is a computer-readable recording medium, and may be constituted by at least one of an optical disk such as a CD-ROM (Compact Disc ROM), a hard disk drive, a flexible disk, a magneto-optical disk (e.g., a compact disk, a digital versatile disk, or a Blu-ray (registered trademark) disk), a smartcard, flash memory (e.g., a card, a stick, or a key drive), a Floppy (registered trademark) disk, a magnetic strip, and the like.

Storage 13 may be called an auxiliary storage apparatus. The aforementioned storage medium may be a database, a server, or another appropriate medium including memory 12 and/or storage 13, for example. Communication unit 14 is hardware for communicating between computers over a wired and/or wireless network (a transmission/reception device), and is also called a network device, a network controller, a network card, a communication module, and the like, for example.

Input unit 15 is an input device that accepts inputs from the exterior (e.g., a keyboard, a mouse, a microphone, a switch, a button, a sensor, or the like). Output unit 16 is an output device that makes outputs to the exterior (e.g., a display, a speaker, or the like). Note that input unit 15 and output unit 16 may be configured integrally (e.g., a touch-screen). The apparatuses such as processor 11 and memory 12 can access each other over bus 17, which is used for communicating information. Bus 17 may be constituted by a single bus, or may be constituted by buses that differ among the apparatuses.

Figure 3:
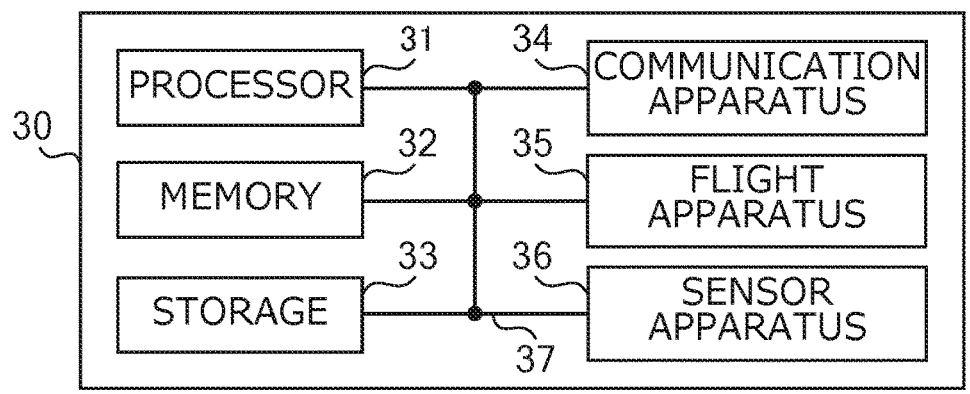
FIG. 3 is a diagram illustrating the hardware configuration of a drone, in accordance to the present invention.

FIG. 3 illustrates the hardware configuration of drone 30. Drone 30 is a computer including the following apparatuses, namely processor 31, memory 32, storage 33, communication unit 34, flying unit 35, sensor unit 36, and bus 37. The term "apparatus" used here can be replaced with "circuit", "device", "unit", or the like. One or more of each apparatus may be included, and some apparatuses may be omitted.

Processor 31, memory 32, storage 33, communication unit 34, and bus 37 are the same as the hardware of the same names illustrated in FIG. 2. Communication unit 34 can not only communicate wirelessly with the network 2, but can also implement wireless communication between drones 30. Flying unit 35 includes the aforementioned rotors and driving means such as a motor for rotating the rotors, and is an apparatus for causing the host device (drone 30) to fly. Flying unit 35 can move the host device in all directions, stop the host device (hovering), and the like while in the air. In the present embodiment, it is assumed that there is not a significant difference in the maximum flight speeds of drones 30.

Sensor unit 36 is an apparatus including a sensor group that obtains information necessary for flight control. Sensor unit 36 includes a position sensor that measures the position (latitude and longitude) of the host device, a direction sensor that measures the direction the host device is facing (a forward direction is defined for drone 30, and the forward direction is the direction the host device is facing), and an altitude sensor that measures the altitude of the host device. In the present embodiment, sensor units 36 of drones 30*a*-1, 30*b*-1, and 30*c*-1 include distance sensors that emit infrared light, millimeter waves, or the like and measure the distance to an object based on the amount of time until reflected waves are received.

On the other hand, sensor apparatuses 36 of drones 30*a*-2, 30*b*-2, and 30*c*-2 do not have distance sensors. Distance sensors are used when performing formation flight in which drones 30 fly in formation while keeping distances from other drones 30 within a predetermined range. That is, drones 30*a*-1, 30*b*-1, and 30*c*-1 include a formation flight function (a function of performing formation flight by controlling distances from other drones 30) and drones 30*a*-2, 30*b*-2, and 30*c*-2 do not include a formation flight function.

Note that server apparatus 10, drones 30, and so on may be configured including hardware such as microprocessors, DSPs (Digital Signal Processors), ASICs (Application Specific Integrated Circuits), PLDs (Programmable Logic Devices), FPGA (Field Programmable Gate Arrays), and the like, and some or all of the function blocks may be realized by that hardware. For example, processor 11 may be provided as at least one of these types of hardware.

Server apparatus 10, terminals 20, and drones 30 included in drone operation management system 1 store programs provided by the system, and implement the following group of functions by the processors included in the devices executing programs and controlling the various units.

Figure 4:
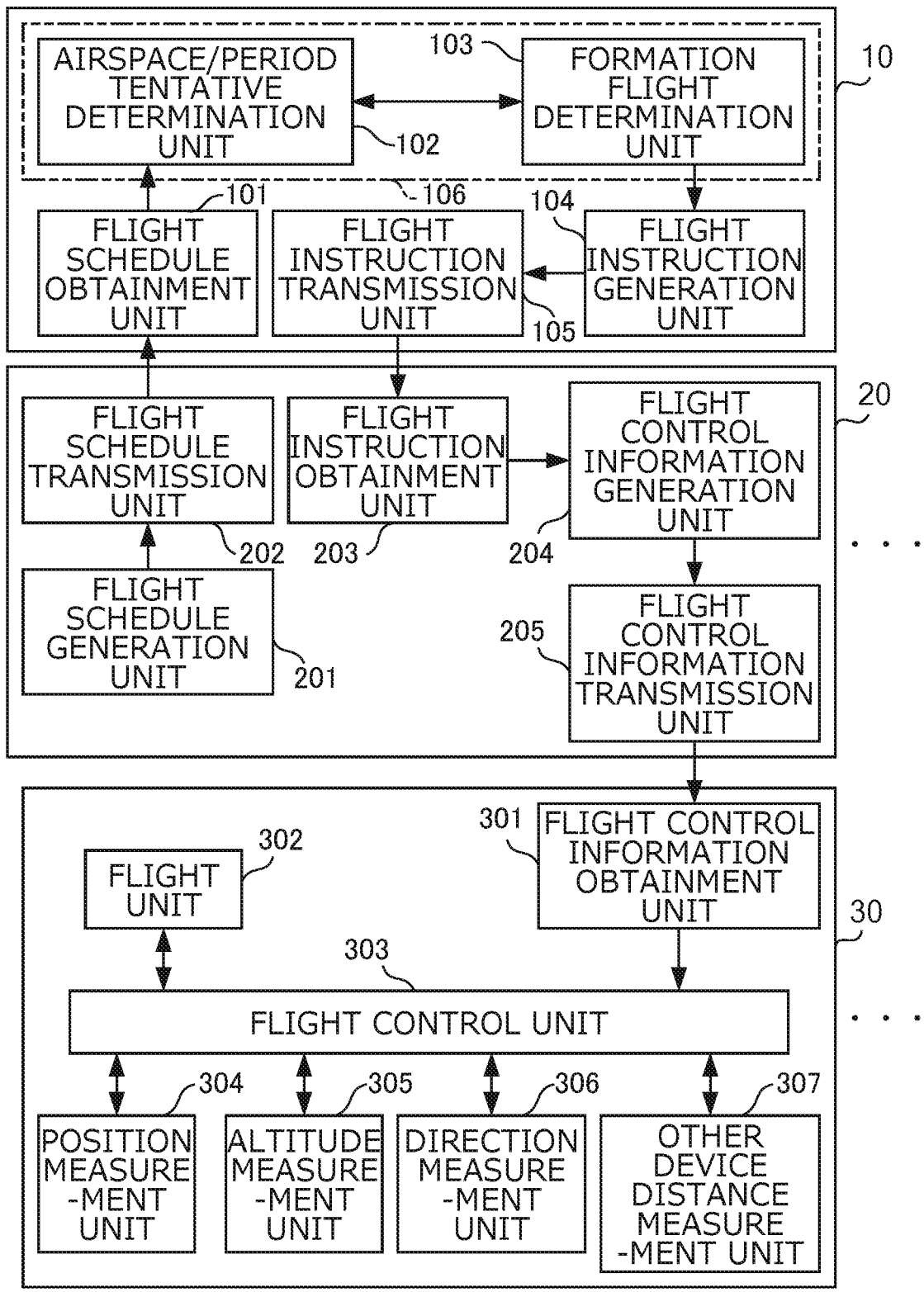
FIG. 4 is a diagram illustrating a functional configuration realized by the drone operation management system, in accordance to the present invention.

FIG. 4 illustrates a functional configuration realized by drone operation management system 1. Although only one each of terminals 20 and drones 30 are illustrated in FIG. 4, the multiple terminals 20 and multiple drones 30 all have the same functional configuration except for some functions.

Server apparatus 10 includes schedule obtainment unit 101, airspace/period tentative determination unit 102, formation flight determination unit 103, instruction generation unit 104, and instruction transmission unit 105. Terminal 20 includes schedule generation unit 201, schedule transmission unit 202, instruction obtainment unit 203, control information generation unit 204, and control information transmission unit 205. Drone 30 includes control information obtainment unit 301, flight unit 302, flight control unit 303, position measurement unit 304, altitude measurement unit 305, direction measurement unit 306, and distance measurement unit 307. Note that distance measurement unit 307 is not provided in drones 30*a*-2, 30*b*-2, and 30*c*-2.

Schedule generation unit 201 of terminal 20 generates flight schedule information indicating the flight schedules of drones 30. The flight schedule information is an example of "schedule information" of the present invention. Due to the above-described operation manager inputting drone IDs (identification) for identifying drones 30 whose flight schedules are to be input, the names of departure points, transit points, and arrival points, and the estimated departure and arrival times into terminal 20, schedule generation unit 201 generates flight schedule information based on these input pieces of information. Note that the flight schedule information is merely information that indicates flight schedules requested or required by an operation manager, and is not information indicating an established flight plan.

Figures 5, 6, 7:
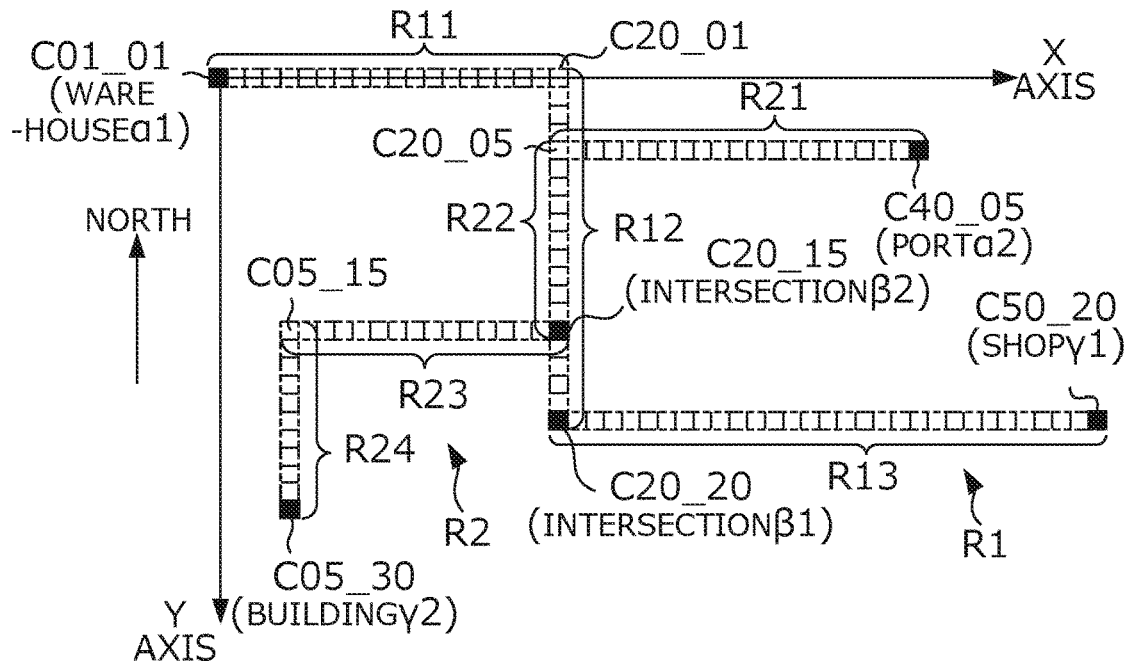
FIG. 5 is a diagram illustrating an example of generated flight schedule information, in accordance to the present invention.
FIG. 6 is a diagram illustrating an example of a flyable airspace table, in accordance to the present invention.
FIG. 7 is a diagram illustrating an example of tentatively-determined airspace, in accordance to the present invention.

FIG. 5 shows an example of generated flight schedule information. In the example shown in FIG. 5, the departure point "warehouse α1", the transit point "intersection β1", the destination "store γ1", the estimated departure time "T1", and the estimated arrival time "T2" are associated with the drone ID "D001" which identifies drone 30*a* shown in FIG. 1. Also, the departure point "port α2", the transit point "intersection β2", the destination "building γ2", the estimated departure time "T3", and the estimated arrival time "T4" are associated with the drone ID "D002" which identifies drone 30*b*-1. Note that this flight schedule information is merely an example, and for example, the transit point and estimated departure time are not included in some cases.

It is assumed that times such as "T1" actually express times in one-minute units, such as "9 hours 00 minutes". Note, however, that the time may be expressed at a finer level (e.g., in units of seconds), or at a broader level (e.g., in units of five minutes). Furthermore, although the date of the flight schedule may also be input, the present embodiment assumes that the operation manager inputs the flight schedule for that day on the morning of that day (i.e., that the date is unnecessary), to simplify the descriptions.

Also, in the example of FIG. 5, function information indicating whether or not each drone 30 includes a formation flight function is included in the flight schedule information. As described above, drones 30*a*-1 and 30*b*-1 both include the formation flight function, and therefore their function information indicates "included". In the present embodiment, the flight schedule information is used to perform notification of whether or not drones 30 include the formation flight function to server apparatus 10 in this manner. Note that server apparatus 10 may also store the function information (information indicating whether or not the formation flight function is included) in association with drone IDs in advance due to, for example, the operation managers performing registration.

Schedule generation unit 201 of A terminal 20a generates the flight schedule information of drone 30a-1, and schedule generation unit 201 of B terminal 20b generates the flight schedule information of drone 30b-1. Schedule generation unit 201 supplies the generated flight schedule information to schedule transmission unit 202. Schedule transmission unit 202 transmits the supplied flight schedule information to server apparatus 10. Schedule obtainment unit 101 of server apparatus 10 obtains the flight schedule information transmitted from each terminal 20. Schedule obtainment unit 101 is an example of an "obtainment unit" according to the present invention.

Schedule obtainment unit 101 supplies the obtained flight schedule information to airspace/period tentative determination unit 102. Based on the supplied flight schedule information of drone 30, airspace/period tentative determination unit 102 tentatively determines the allocation of the airspace through which drone 30 is to fly (the space through which drone 30 is to pass when flying from the departure point to the destination), and the permitted flight period (the period during which flight in the airspace is permitted).

In drone operation management system 1, permitted airspace through which drones 30 can fly are determined in advance, in the same manner as a network of roads. The permitted airspace is of course airspace for which permission necessary for flight has been obtained, and may sometimes contain airspace for which permission is not needed. In the present embodiment, the permitted airspace is expressed as cubic spaces laid out without gaps therebetween (called "cells" hereinafter), and each cell is assigned a cell ID for identifying that cell.

Server apparatus 10 stores a flyable airspace table in which the cell ID, center coordinates of the cell, the length of one side of the cubic cell, and whether or not flight is permitted, are associated with each other.

FIG. 6 illustrates an example of the flyable airspace table. In the example of FIG. 6, cell IDs "C01_01", "C02_01", and so on up to "C99_99" are associated with center coordinates "x1,y1,z1", "x2,y1,z1", and so on up to "x99,y99,z99", respectively.

In the present embodiment, to simplify the descriptions, the cells have a constant altitude, and the xy coordinates of each cell are indicated as being associated with the cell ID (e.g., the cell having xy coordinates of (x10,y15) is given a cell ID of C10_15). In the example of FIG. 6, the lengths of the sides of each cell are all "L1". For whether or not flight is permitted, a circle indicates that flight is permitted, while an x indicates that flight is not permitted.

First, among cells of the possible airspace, airspace/period tentative determination unit 102 specifies the closest cell to the departure point (departure point cell) included in the flight schedule, the closest cell to the transit point (transit point cell), and the closest cell to the destination (destination cell). Next, airspace/period tentative determination unit 102 tentatively determines an airspace that extends from the specified departure point cell, through the transit point cell, and to the destination cell, and for which the flight distance is the shortest, for example, from among the possible airspaces, and extracts the cell IDs of the cells included in the tentatively-determined airspace.

FIG. 7 illustrates an example of the tentatively-determined airspace. FIG. 7 illustrates an x axis and a y axis that take the center of cell C01_01 (the cell with a cell ID of C01_01) as the origin, with the direction of the arrow on the x axis called the x axis positive direction, the direction opposite thereto called the x axis negative direction, the direction of the arrow on the y axis called the y axis positive direction, the direction opposite thereto called the y axis negative direction, and the y axis negative direction assumed to be north. The example of FIG. 7 illustrates airspace R1 spanning from "warehouse α1", through "intersection β1", to "store γ1" included in the flight schedule illustrated in FIG. 5.

Airspace R1 includes divided airspace R11 (an airspace obtained by dividing the airspace) that extends from cell C01_01, which is the departure point cell, through cells adjacent thereto in the x axis positive direction, to cell C20_01, divided airspace R12, which extends from cell C20_01, through cells adjacent thereto in the y axis positive direction, to cell C20_20, which is the transit point cell, and divided airspace R13, which extends from cell C20_20, through cells adjacent thereto in the x axis positive direction, to cell C50_20, which is the destination cell.

Also, the example of FIG. 7 shows airspace R2, which extends from "port α2" included in the flight schedule shown in FIG. 5, through "intersection β2", to "building γ2". Airspace R2 includes divided airspace R21 that extends from cell C40_05, which is the departure point cell, through cells adjacent thereto in the x axis negative direction, to cell C20_05, divided airspace R22, which extends from cell C20_05, through cells adjacent thereto in the y axis positive direction, to cell C20_15, which is a transit point cell, divided airspace R23, which extends from cell C20_15, through cells adjacent thereto in the x axis negative direction, to cell C05_15, and divided airspace R24, which extends from cell C05_15, through cells adjacent thereto in the y axis positive direction, to cell C05_30, which is the destination cell.

In the present embodiment, airspace/period tentative determination unit 102 tentatively determines the permitted flight period for each divided airspace. For example, airspace/period tentative determination unit 102 calculates a period obtained by dividing a period, from the estimated departure time to the estimated arrival time included in the flight schedule, according to a ratio based on the length of each divided airspace, as an airspace passage period required when passing through each divided airspace.

For example, if the ratio of the lengths of divided airspaces R11, R12, and R13 in airspace R1 is 2:2:3, and the period from the estimated departure time to the estimated arrival time is 70 minutes, airspace/period tentative determination unit 102 calculates 20 minutes:20 minutes:30 minutes as the airspace passage periods for the divided airspaces. Airspace/period tentative determination unit 102 tentatively determines, as the permitted flight period in each divided airspace, a period that takes, as a start time or an end time, a time to which a margin period is added before and after times after which the airspace passage periods have passed in sequence following the estimated departure time (i.e., a time after the passage of 20 minutes, a time after the passage of 40 minutes, and a time after the passage of 70 minutes).

Figures 8, 9:
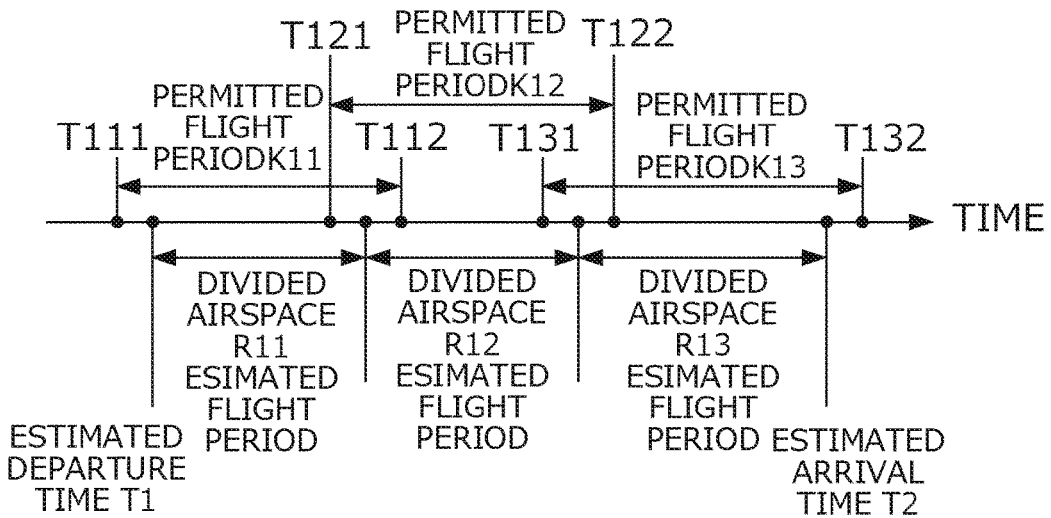
FIG. 8 is a diagram illustrating an example of tentatively-determined permitted flight periods, in accordance to the present invention.
FIG. 9 is a diagram illustrating an example of tentative determination information, in accordance to the present invention.

FIG. 8 illustrates an example of tentatively-determined permitted flight periods. With respect to divided airspace R11, assuming the margin period is three minutes, for example, airspace/period tentative determination unit 102 tentatively determines, as the permitted flight period, period K11, which takes three minutes before estimated departure time T1 as start time T111, and takes a time when the margin period of three minutes has passed following the passage of the airspace passage period (20 minutes) for divided airspace R11 from estimated departure time T1 (i.e., 23 minutes after estimated departure time T1) as end time T112.

With respect to divided airspace R12, airspace/period tentative determination unit 102 tentatively determines, as the permitted flight period, period K12, which takes a time that is the margin period of three minutes before a time at which 20 minutes, which is the airspace passage period of divided airspace R11, has passed following estimated departure time T1 (i.e., 17 minutes after estimated departure time T1), as start time T121, and which takes a time at which the margin period of three minutes has passed after the passage of 40 minutes corresponding to the airspace passage periods in both divided airspaces R11 and R12 from estimated departure time T1 (i.e., 43 minutes after estimated departure time T1) as end time T122.

With respect to divided airspace R13, airspace/period tentative determination unit 102 tentatively determines, as the permitted flight period, period K13, which takes a time that is the margin period of three minutes before a time at which the 40 minutes corresponding to the airspace passage periods of both divided airspaces R11 and R12 have passed after estimated departure time T1 (i.e., 37 minutes after estimated departure time T1) as start time T131, and which takes a time at which the margin period of three minutes has passed after the passage of 70 minutes corresponding to the airspace passage periods of divided airspaces R11, R12, and R13 from estimated departure time T1 (i.e., 73 minutes after estimated departure time T1 or three minutes after estimated arrival time T2) as end time T132.

Note that if no transit point or schedule times are included in the flight schedule shown in FIG. 5, airspace/period tentative determination unit 102 may also set and tentatively determine transit points and schedule times such that the airspaces and permitted flight periods overlap, in order to cause drone 30 to perform formation flight with other drones 30. Also, if allocatable airspace is insufficient (e.g., if the number of cells for which allocation has not been tentatively determined is less than or equal to a threshold value), airspace/period tentative determination unit 102 may also change and tentatively determine the transit points, schedule times, and the like such that the airspaces and the permitted flight periods overlap, in order to similarly cause drone 30 to perform formation flight with other drones 30.

Airspace/period tentative determination unit 102 supplies the flight schedule information as well as tentative determination information indicating the airspace and the permitted flight period that were tentatively determined as described above to formation flight determination unit 103.

FIG. 9 shows an example of the tentative determination information. In the tentative determination information, the cell IDs of the cells included in the airspace are grouped together for each divided airspace, permitted flight periods corresponding to each divided airspace are associated therewith, and the drone IDs of drones 30 for which the airspaces and permitted flight periods have been tentatively determined and information indicating whether or not the formation flight function (the above-described function information) is included are associated with each other.

For example, the group of cell IDs included in divided airspaces R11, R12, and R13, the start times and end times of periods K11, K12, and K13, which are the permitted flight periods, and information indicating that a formation flight function is "included" are associated with the drone ID "D001". Formation flight determination unit 103 performs determination relating to formation flight (flight in formation) of drones 30 for which the same airspace has been tentatively determined.

Specifically, formation flight determination unit 103 determines whether or not it is necessary to perform formation flight (whether or not formation flight is needed), the combination of drones 30 to perform formation flight (the combination of formation flight), and the positions of drones 30 performing formation flight (positions of formation flight). If it is expected that drones 30 that will fly in the same direction in the same airspace will come closer than a predetermined distance to each other, formation flight determination unit 103 determines that those drones 30 need to perform formation flight. Formation flight determination unit 103 determines whether or not the above-described approach of drones 30 is expected, based on the airspace and the permitted flight periods tentatively determined by airspace/period tentative determination unit 102.

Formation flight determination unit 103 calculates, for example, an airspace passage period that is needed when passing through the entire airspace, and divides the calculated airspace passage period by the number of cells included in the airspace. The divided periods indicate periods that are needed for drones 30 to pass through the cells. Formation flight determination unit 103 calculates the times obtained by sequentially adding the divided periods to the estimated departure time as the times at which it is expected that drones 30 will start flight in the cells and the times at which it is expected that drones 30 will end flight in the cells. Hereinafter, the start times and end times will be referred to as "cell flight times".

In the present embodiment, if the following three conditions are satisfied, formation flight determination unit 103 determines that it is expected that drones 30 that fly in the same direction in the same airspace will come closer than a predetermined distance to each other.

Condition 1: There is a redundant cell whose allocation has been tentatively determined for two or more drones 30, or the distance between tentatively-determined cells is within a threshold value.

Condition 2: The flight directions in the redundant cell of the two or more drones 30 match.

Condition 3: A difference between the cell flight times of the redundant cell of the two or more drones 30 is less than a threshold value.

Specifically, formation flight determination unit 103 determines that Condition 3 is satisfied when any of the differences between the start times and the difference between the end times of the cell flight times is less than a threshold value. For example, in the example shown in FIG. 7, the cells from cell C20_05 to C20_15 are redundant cells whose allocation has been tentatively determined for both drone 30a-1 and drone 30b-1.

Drones 30a-1 and 30b-1 both moves in the y axis positive direction in these redundant cells, and therefore Condition 2 is satisfied. If the difference between the cell flight times of drones 30a-1 and 30b-1 in these redundant cells is less than a threshold value, Condition 3 is also satisfied, and therefore formation flight determination unit 103 determines that drones 30a-1 and 30b-1 are to perform formation flight.

If it is determined that multiple drones 30 are to perform formation flight, and if the following Condition 4 or Condition 5 is further satisfied, formation flight determination unit 103 determines the combination of these drones 30 as the combination of drones 30 to perform formation flight.

Condition 4: All drones 30 include a formation flight function.

Condition 5: Only one drone 30 does not include a formation flight function.

When the tentative determination information shown in FIG. 9 is supplied, the tentative determination information indicates that both drones 30a-1 and 30b-1 include the formation flight function, and thus Condition 4 is satisfied. For this reason, formation flight determination unit 103 determines that the combination of drones 30*a*-1 and 30*b*-1 is the combination of drones 30 that are to perform formation flight. Next, formation flight determination unit 103 determines the positions of multiple drones 30 that are to perform formation flight. Formation flight determination unit 103 is an example of a "determination unit" of the present invention.

If Condition 4 is satisfied, in the present embodiment, formation flight determination unit 103 determines an arrangement in which drones 30 are aligned linearly in the travel direction and are aligned in the order in which drones 30 withdraw from formation flight, as the arrangement of multiple drones 30. The order in this context may be an order starting from the front, or an order starting from the rear.

For example, if three drones are performing formation flight with a gap of distance L11 therebetween, when the second drone 30 withdraws during flight, the distance between the third drone 30 and the front drone 30 will be L11×2 at the instant the second drone 30 withdraws, and therefore the third drone 30 will need to reduce the gap until distance L11 is reached. At this time, if the flight speed of the third drone 30 is insufficient, there is a risk that drone 30 will not be able to reduce the gap, and formation flight can no longer be continued.

In this case, front drone 30 may also reduce its flight speed, but complicated control is needed in which the flight speed is reduced at the withdrawal timing until the gap is reduced, whereupon the flight speed is returned to normal. As described above, if an arrangement is used in which drones 30 are aligned in the order of withdrawing from formation flight, a middle drone 30 (drone 30 interposed between other front and rear drones 30) will not withdraw in that manner, and therefore formation flight can be continued stably in comparison to a case of not using that arrangement, and it is possible to eliminate the need for the above-described complicated control for continuing formation flight.

Also, if Condition 5 is satisfied, formation flight determination unit 103 determines an arrangement in which drone 30 indicated by Condition 5, that is, drone 30 that does not include a formation flight function, is placed at the front, and drones 30 that include a formation flight function are placed therebehind. Formation flight determination unit 103 performs this determination based on the function information (information indicating whether or not the formation flight function is included), which is included in the tentative determination information supplied from airspace/period tentative determination unit 102.

As described above, by determining the arrangement, if only one drone 30 does not include the formation flight function, that drone 30 is placed at the front, whereby formation flight can be performed by causing successive drones 30 that include the formation flight function to follow the front. Note that if server apparatus 10 has already stored the function information, formation flight determination unit 103 may also determine the arrangement based on the function information.

In any case, formation flight determination unit 103 is an example of a "function obtainment unit" of the present invention, which obtains function information. The function information included in the tentative determination information is information included in the flight schedule information originally obtained by schedule obtainment unit 101, and therefore schedule obtainment unit 101 is also an example of a "function obtainment unit" of the present invention.

Note that even if it is expected that drones 30 that fly in the same direction in the same airspace will not come closer than a predetermined distance to each other, that is, even if Conditions 1 to 3 are not satisfied, for example, when allocatable airspace is insufficient, formation flight determination unit 103 may also change the threshold values of Conditions 1 and 3 to determine the combination of drones 30 that are to perform formation flight.

If Conditions 1, 2, and 3 are satisfied but neither Condition 4 nor Condition 5 is satisfied, formation flight determination unit 103 performs notification of the fact that formation flight is to be performed but cannot be performed due to a lack of the formation flight function, and performs notification of the drone IDs of target drones 30 to airspace/period tentative determination unit 102 (this is called "notification of function deficiency").

Also, if Conditions 1 and 3 are satisfied but Condition 2 is not, formation flight determination unit 103 performs notification of the fact that an abnormal approach in which drones 30 pass by each other while approaching each other (a so-called "near miss") will occur, and performs notification of the drone IDs of target drones 30 to airspace/period tentative determination unit 102 (this is called "near miss notification").

Also, if allocatable airspace is insufficient (e.g., if the number of cells for which allocation has not been tentatively determined is a threshold value or lower), formation flight determination unit 103 performs notification of the fact that drone 30 that is somewhat far away (determination performed by increasing the threshold values of Conditions 1 and 3) is to also be subjected to formation flight, as well as notification of the drone ID of target drone 30 to airspace/period tentative determination unit 102. Also, even if drone 30 does not satisfy Conditions 1 to 3, if there is no description of transit points or schedule times in the supplied flight schedule information of that drone 30, formation flight determination unit 103 performs notification of the fact that transit points or schedule times are to be set and tentatively determined so as to satisfy Conditions 1 to 3, as well as notification of the drone ID of target drone 30 to airspace/period tentative determination unit 102 (these are both called "target expansion notification").

Upon receiving notification of a function deficiency, a near-miss notification, or a target expansion notification, airspace/period tentative determination unit 102 changes one or both of the airspace and permitted flight period that were tentatively determined for other drones 30 except for the one, among drones 30 with the drone IDs that were notified together. For example, airspace/period tentative determination unit 102 delays the estimated departure time and estimated arrival time of target drone 30 by a predetermined amount of time with respect to the time indicated by the flight schedule information, and tentatively determines the permitted flight period once again using the same method as described above.

Note that instead of tentatively determining the airspace with the shortest flight distance, airspace/period tentative determination unit 102 may also tentatively determine the airspace with the second-shortest or third-shortest flight distance. Also, airspace/period tentative determination unit 102 may tentatively determine an airspace with a changed transit point. In these cases, airspace/period tentative determination unit 102 tentatively determines the permitted flight period using the same method as that described above, with respect to an airspace that was once again tentatively determined.

Upon once again tentatively determining the airspace with any method, airspace/period tentative determination unit 102 supplies the tentative determination information reflecting the results of the tentative determination to formation flight determination unit 103. Formation flight determination unit 103 performs determination of formation flight as described above, based on the changed tentative determination information. In this manner, airspace/period tentative determination unit 102 and formation flight determination unit 103 repeatedly perform the above-described operations until notification of a function deficiency, near-miss notification, and target expansion notification are no longer performed (that is, until a function deficiency, near misses, and target expansions no longer occur).

When the above-described notifications are no longer performed, formation flight determination unit 103 confirms the airspace and the permitted flight period that were ultimately tentatively determined, as the officially-allocated airspace and permitted flight period. Airspace/period tentative determination unit 102 and formation flight determination unit 103 function as allocation units 106 that allocate airspaces to drones 30 based on the flight schedule information obtained by schedule obtainment unit 101 in this manner, and allocate airspace and the permitted flight period during which flight is permitted in the airspace.

If there is a predetermined commonality in the airspaces and the flight directions of multiple drones 30, allocation unit 106 causes those multiple drones 30 to share the airspace under the condition that formation flight in which distances therebetween are controlled is performed. For example, if it is expected that drones 30 that fly in the same direction in the same airspace will come closer than a predetermined distance to each other, allocation unit 106 determines that there is a predetermined commonality.

Also, even if it is not expected that drones will fly in the same direction in the same airspace or that the drones will come closer than a predetermined distance to each other based on a flight schedule determined by an operation manager, for example, if drones will fly in the same direction in the same airspace and come closer than a predetermined distance to each other when an above-described target expansion notification is performed and a route from a departure point to a destination or a schedule time is changed, allocation unit 106 determines that those drones 30 have a predetermined commonality in the airspaces and flight directions, and causes those drones 30 to share the airspace under the condition that drones 30 perform formation flight.

To instruction generation unit 104, formation flight determination unit 103 supplies formation flight information indicating the combination of drones 30 that are to perform formation flight determined as described above, the alignment order used when performing formation flight, the cell IDs of redundant cells in which those drones 30 fly, and the cell flight times calculated during this determination (estimated period of flying through the cells when drones 30 fly as scheduled).

Also, together with the flight formation information, formation flight determination unit 103 supplies, to instruction generation unit 104, tentative determination information used in the final determination of the information indicated by the formation flight information, as allocation information indicating the allocation of the official airspaces and permitted flight period confirmed as described above. Based on the supplied formation flight information and allocation information, instruction generation unit 104 generates a flight instruction for drones 30 to which the flight schedule was transmitted.

Figures 10A, 10B:
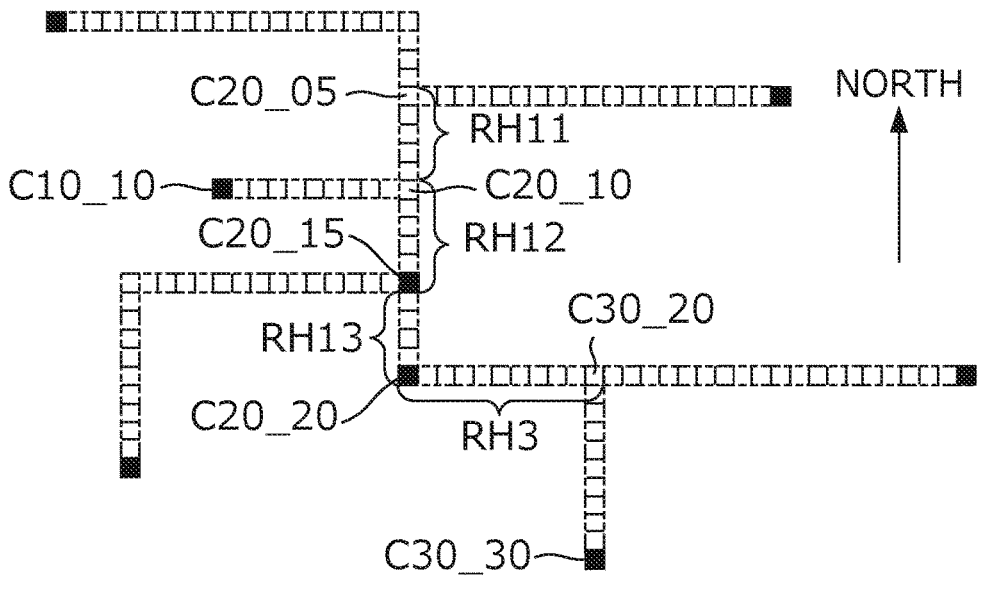
FIG. 10A is a diagram illustrating an example of a flyable airspace table, in accordance to the present invention.
FIG. 10B is a diagram showing an example of a generated flight instruction, in accordance to the present invention.

FIG. 10 shows an example of a generated flight instruction. In FIG. 10, an example is illustrated in which the above-described drones 30a-1 and 10b-1, as well as drone 30c-1, to which the airspace from cell C10_10, through cell C20_10, cell C20_20, and cell 30_20, to cell C30_30 has been allocated as shown in FIG. 10(a), are subjected to formation flight. As shown in FIG. 10(b), instruction generation unit 104 generates a flight instruction indicating the drone IDs, the airspaces, and the permitted flight periods indicated by the allocation information, as well as a merging cell in which other drones 30 are merged with, a merging time in the merging cell, and an alignment order in formation flight.

In the example shown in FIGS. 10A and 10B, the cell IDs of the airspace and the start times and the end times of the permitted flight period are omitted. For example, it is indicated that drone 30a-1 (drone ID=D001) and drone 30b-1 (drone ID=D002) will merge at merging time TG1 in cell C20_05, which is the merging cell, and the alignment order at that time will be, starting from the front: drone 30a-1, drone 30b-1.

Also, it is indicated that drones 30a-1, 30b-1, and 30c-1 (drone ID=D003) will merge at merging time TG2 in cell C20_10, which is the merging cell, and the alignment order at that time will be, starting from the front: drone 30a-1, drone 30c-1, drone 30b-1. Note that each drone 30 naturally withdraws from formation flight at the point where its airspace splits with other drones 30 by flying through its allocated airspace.

In the example shown in FIG. 10, in formation airspace RH11, which extends from cell C20_05, which is a merging cell, to cell C20_10, which is a merging cell, two drones, namely drones 30a-1 and 30b-1. Next, in formation airspace RH12, which extends from cell C20_10, which is a merging cell in which drone 30c-1 merges, to cell C20_15, which is a merging cell in which drone 30b-1 withdraws, three drones, namely drones 30a-1, 30c-1, and 30b-1 perform formation flight.

Then, in formation airspace RH13, which extends from cell C20_15 to cell C30_30, in which the airspaces of drones 30a-1 and 30c-1 split apart, two drones, namely drones 30a-1 and 30c-1 perform formation flight. Based on the formation flight information and the allocation information, instruction generation unit 104 extracts the cell IDs of the front of the overlapping cells included in the airspaces associated with drones 30 that are to perform formation flight, as the cell IDs of the merging cells.

Also, for example, instruction generation unit 104 calculates, as the merging time, a time obtained by estimating a delay that is allowed (e.g., a delay such that if drone 30 performing formation flight flies at a higher speed than normal, drone 30 can recover from the delay in the cell flight time before the next destination point) in the latest time (the arrival time of the drone that will arrive the latest at the merging cell) among the start times of the cell flight times of the merging cell of drones 30 that are to merge in the merging cell. In the present embodiment, this merging time is used as a time limit for arrival at the merging position.

Also, instruction generation unit 104 calculates the alignment order in the formation flight determined for drones 30 that are to be subjected to formation flight. Instruction generation unit 104 generates a flight instruction (information indicating a flight instruction) including the merging cells calculated in the described manner, the merging times, and the alignment order in formation flight that is to be performed after merging. Instruction generation unit 104 supplies the generated flight instruction to instruction transmission unit 105. Instruction transmission unit 105 transmits the supplied flight instruction to terminal 20, which is used by the operation manager of drone 30 with the drone ID included in the flight instruction.

Instruction obtainment unit 203 of terminal 20 obtains the transmitted flight instruction and supplies the flight instruction to control information generation unit 204. Control information generation unit 204 generates the above-described flight control information (group of parameters by which drone 30 controls its own flight).

Figures 11A, 11B:
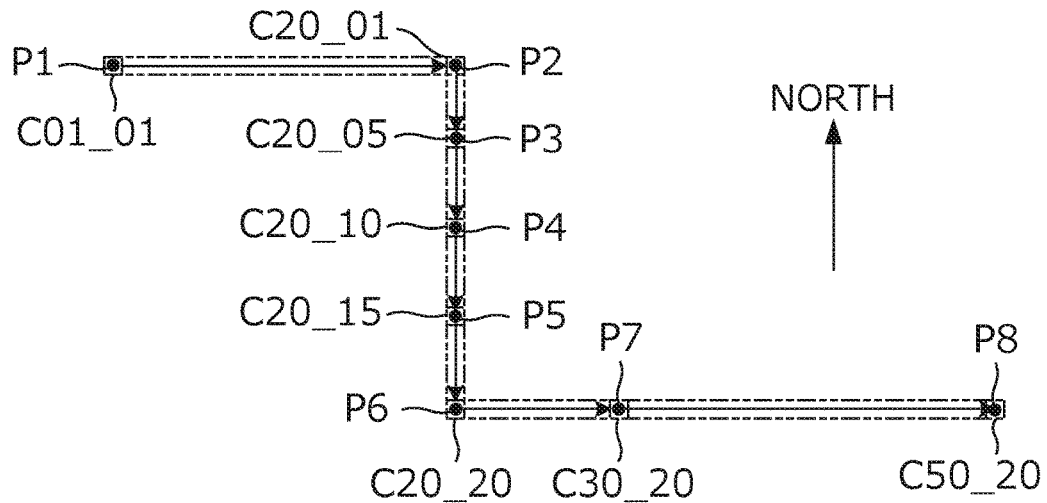
FIG. 11A is a diagram illustrating an example of a flyable airspace table, in accordance to the present invention.
FIG. 11B is a diagram illustrating an example of generated flight control information, in accordance to the present invention.

FIG. 11B shows an example of the generated flight instruction. FIG. 11B shows the above-described flight control information for drone 30*a*-1.

As shown in FIG. 11A, an airspace in which drone 30*a*-1 passes through cell C20_01 from cell C01_01, which is the departure point, and performs merging in cell C20_05 and cell C20_10, which are merging cells, drone 30*b*-1 withdraws in cell C20_15, drone 30*a*-1 passes through cell C20_20, which is a transit point, drone 30*c*-1 withdraws in cell C30_20, and drone 30*a*-1 arrives at cell C50_20, which is the destination cell, is allocated to drone 30*a*-1.

First, control information generation unit 204 calculates coordinates P1, P2, P3, P4, P5, P6, P7, and P8 of the center points of these eight cells as target point coordinates (coordinates of target points to be arrived at next), and generates the flight control information including those coordinates. In drone operation management system 1, a drone port where drone 30 can land is prepared at the point designated as the destination, and terminal 20 stores the coordinates of each drone port in association with the name of the destination. In the example of FIG. 11B, control information generation unit 204 adds coordinates P9 of the drone port associated with "store γ1", which is the destination of drone 30*a*-1, to the flight control information as the target point coordinates.

Control information generation unit 204 adds, to the flight control information, the flight altitude, flight direction, flight speed, spatial width, target arrival time, and order/number of drones in formation (number of drones 30 that perform formation flight) when flying to each of the target point coordinates. As, for example, the flight altitude, control information generation unit 204 adds "0-A1" to the flight to coordinates P1 (takeoff); "A1", to the flight up to coordinates P8 following thereafter (horizontal flight); and "A1-0", to the flight up to coordinates P9 (landing).

Additionally, as the flight direction, control information generation unit 204 adds "eastward" from coordinates P1 to coordinates P2, "southward" from coordinates P2 to coordinates P6, and "eastward" from coordinates P7 to coordinates P8, in which the horizontal flight is carried out. Furthermore, as the flight speed from P1 to P8, in which the horizontal flight is carried out, control information generation unit 204 adds an average speed V1 when flying in the airspace during a period from estimated departure time T1 to estimated arrival time T2 included in the flight schedule, for example.

Furthermore, control information generation unit 204 adds a length L1 of one side of the cell, as defined in the present embodiment, as the spatial width of the airspace from coordinates P1 to coordinates P8, in which the horizontal flight is carried out. The three spatial widths "L1, L1, L1" indicated in FIG. 11 refer to widths in three directions, namely the x axis direction, the y axis direction, and the z axis direction. The flight direction, flight speed, and spatial width are not needed during takeoff and landing and are therefore left blank.

Additionally, control information generation unit 204 adds a time using the estimated departure time T1 and estimated arrival time T2, the start time and end time of the permitted flight period, and the merging time as the target arrival time for each of the target point coordinates. For example, as the target arrival time for coordinates P1, control information generation unit 204 defines time T111', which follows, by a predetermined amount of time, start time T111 of period K11, which is the permitted flight period for divided airspace R11 starting from cell C01_01 that includes coordinates P1.

Entering cell C01_01 before start time T111 corresponds to entry prior to period K11, which is the permitted flight period, and thus time T111' expresses a time that has passed following start time T111 by an amount of time longer than the amount of time required to arrive at coordinates P1 after entering cell C01_01. Arriving after time T111' corresponds to entering divided airspace R11 once in period K11, which is the permitted flight period.

Additionally, as the target arrival time for coordinates P2, which correspond to the boundary between divided airspaces R11 and R12, control information generation unit 204 defines a time from time T121', which follows, by a predetermined amount of time, start time T121 of the permitted flight period of divided airspace R12 starting from cell C20_01 that includes coordinates P2, to time T112', which precedes, by a predetermined amount of time, end time T112 of the permitted flight period of divided airspace R11 that ends at cell C20_01.

Like time T111', arriving at coordinates P2 after time T121' corresponds to entering divided airspace R12 once in period K12, which is the permitted flight period. It is assumed that time T112' expresses a time that has passed following end time T112 by an amount of time longer than the amount of time required to exit cell C20_01 from coordinates P2. Arriving at coordinates P2 before time T112' means that if the flight is continued, divided airspace R11 can be exited before period K11, which is the permitted flight period, ends. The target arrival time at coordinates P6, which corresponds to the boundary between divided airspaces R12 and R13, is determined through the same method.

Also, control information generation unit 204 determines a time prior to merging time TG1 in cell C20_05, which is a merging cell including coordinate P3, as the target arrival time at coordinate P3. A time prior to merging time TG2 is also set as the target arrival time to coordinate P4 using the same method. Coordinates P3 and P4 of the centers of these merging cells indicate positions at which drones 30 that are to go into formation merge (merging positions).

Also, as the target arrival time to coordinate P5 at which drone 30*b*-1 withdraws, control information generation unit 204 determines a time after time T231, which is a predetermined amount of time later than start time T231 of the permitted flight period of divided airspace R23, which starts from cell C20_15 including coordinate P5. This is because upon arriving at that time, drone 30*b*-1 advances into divided airspace R23 after entering period K23, which is the permitted flight period. The target arrival time at coordinate P7, at which drone 30*c*-1 withdraws, is determined using the same method.

As the target arrival time at coordinates P8, control information generation unit 204 defines a time before time T132', which precedes, by a predetermined amount of time, end time T132 of period K13, which is the permitted flight period of divided airspace R13 that ends at cell C50_20 including coordinates P8. Arriving at coordinates P2 before time T132' means that if the flight is continued, divided airspace R13 can be exited before period K13, which is the permitted flight period, ends.

Also, control information generation unit 204 determines "½" (meaning that formation flight is to be performed as the front of two drones), which is the alignment order/number of drones in formation when heading from coordinate P3, which is the merging position, to coordinate P4, which is the next target point, and "⅓" (meaning that formation flight is to be performed as the front of three drones), which is the alignment order/number of drones in formation when heading from coordinate P4, which is a merging position, to coordinate P5, which is the next target point.

Also, control information generation unit 204 determines "½", which is the alignment order/number of drones in formation from coordinate P5 at which drone 30b-1 withdraws, to coordinate P7 at which drone 30c-1 withdraws. In this manner, control information generation unit 204 generates the flight control information including the alignment order after merging. Control information generation unit 204 supplies the generated flight control information to control information transmission unit 205.

Control information transmission unit 205 transmits the supplied flight control information to target drone 30. Control information obtainment unit 301 of drone 30 obtains the flight control information that has been transmitted and supplies the obtained flight control information to flight control unit 303. Flight unit 302 is a function for causing the host device (that drone) to fly. In the present embodiment, flight unit 302 causes the host device to fly using the rotors, driving means, and so on included in flying unit 35.

Flight control unit 303 controls flight unit 302 based on the flight control information supplied from control information obtainment unit 301, and carries out a flight control process of controlling the flight of the host device. Position measurement unit 304 measures the position of the host device, and supplies position information indicating the measured position (e.g., latitude/longitude information) to flight control unit 303. Altitude measurement unit 305 measures the altitude of the host device, and supplies altitude information indicating the measured altitude (e.g., information indicating the altitude in cm) to flight control unit 303.

Direction measurement unit 306 measures the direction that the front surface of the drone is facing and supplies direction information indicating the measured direction (e.g., information indicating each direction as an angle up to 360 degrees, where 0 degrees is true north) to flight control unit 303. Distance measurement unit 307 measures the distances between the drone and other drones 30 that are present around the drone. Distance measurement unit 307 measures, for example, the distances from drones 30 that are present in the travel direction of the drone, and supplies distance information indicating the measured distances to flight control unit 303. The position information, altitude information, direction information, and distance information mentioned above are repeatedly supplied to flight control unit 303 at a predetermined time interval (e.g., every second, etc.).

Flight control unit 303 controls the flight of the host device based on the repeatedly-supplied position information, altitude information, and direction information, as well as the distance information when drone 30 includes distance measurement unit 307, in addition to the above-described flight control information. Flight control unit 303 controls the altitude of the host device so that the measured altitude remains at the flight altitude indicated by the flight control information, for example (altitude control). Flight control unit 303 also controls the flight speed of the host device so that changes in the measured position, i.e., the speed, remains at the flight speed indicated by the flight control information (speed control).

Flight control unit 303 also controls the flight altitude and the flight direction so that the host device stays within a quadrangular (square, in the present embodiment) range centered on coordinates of a line connecting the previous target point coordinates with the next target point coordinates (airspace passage control). This quadrangle expresses the boundaries of the airspace, corresponds to cross-section when the airspace is segmented by a plane orthogonal to the travel direction, and has a length on one side corresponding to the spatial width of the airspace. Flight control unit 303 controls the host device based on the measured position and altitude, and the dimensions of the host device (vertical dimensions and horizontal dimensions) so that the host device stays within the quadrangular range.

When the target point coordinates approach, flight control unit 303 controls the flight speed so as to reduce the flight speed if the arrival will be before the target arrival time and increase the flight speed if the arrival will be after the target arrival time (arrival control). Also, if the target point is a merging position, flight control unit 303 performs control according to which, upon arriving at the target point, the drone waits at a waiting location near the cell including the merging position.

For example, an edge of a cell including the merging position is used as the waiting location, or a cell that is near the cell including the merging position and is not being used as an airspace is used as the waiting location. Also, flight control unit 303 performs wireless communication with drones 30 in the surrounding area while waiting at the waiting location, and determines whether or not a predetermined number of drones that are to perform formation flight (the number of drones in formation indicated by the flight control information) are present. If it is determined that all of the drones are present before the merging time, flight control unit 303 performs control for forming a formation in order to perform formation flight from a merging location to the next destination point coordinate (formation forming control).

In formation flight, a parent drone that has a role of leading other drones 30 and child drones that have a role of flying following the parent drone are set. In the present embodiment, drone 30 whose position of formation flight is frontmost (the front) in the travel direction is the parent drone, and drones 30 that are second and later (following) are set as child drones. If the drone including flight control unit 303 is set as the parent drone, flight control unit 303 starts flight after notifying other drones 30 (child drones) through wireless communication that the drone will depart.

Also, if the drone in which flight control unit 303 is included is the second drone, upon receiving a notification of departure from the front, when a predetermined amount of time (an amount of time according to which the gap with previous drone 30 will not increase to the gap used during formation flight) has elapsed, flight control unit 303 notifies other drones 30 through wireless communication that the drone will depart, and thereafter flight control unit 303 starts flight. Thereafter, flight control units 303 of drones 30 perform the same control in the orders of their drones, whereby drones 30 start flight in the alignment order at the time of formation flight, and as a result, a formation in which drones 30 are aligned according to the alignment order is formed.

Also, with drone 30 including distance measurement unit 307, flight control unit 303 performs control for maintaining formation by adjusting the flight speed and flight direction such that the measured distances from other drones (gaps between drones 30) fall within a predetermined range (formation forming control). For example, a range of distance L1 or more and distance L2 or less is used as the range of distances. For example, a distance according to which collision can be avoided even if drone 30 located in front rapidly decelerates is used as distance L1, and for example, a distance according to which the distance sensor can reliably measure the distance from drone 30 located in front is used as distance L2.

Based on the configuration described above, the apparatuses included in drone operation management system 1 carry out an allocation process for allocating airspace and permitted flight periods to drones 30.

Figure 12:
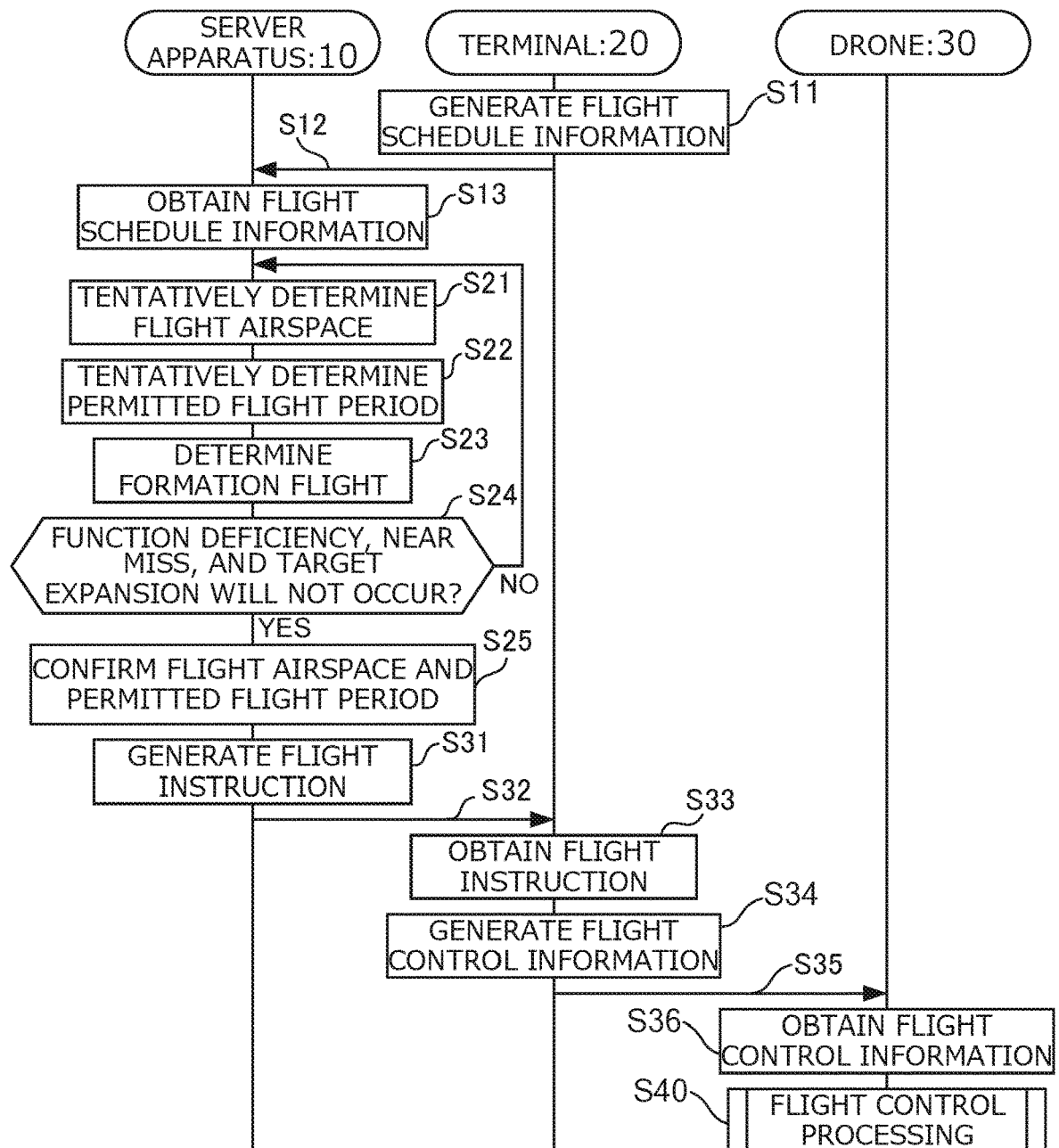
FIG. 12 is a diagram illustrating an example of operation sequences carried out by apparatuses in an allocation process, in accordance to the present invention.

FIG. 12 illustrates an example of operation sequences carried out by the apparatuses in the allocation process. This operation sequence is started upon an operation manager of drone 30 inputting the flight schedule into terminal 20, for example. First, terminal 20 (schedule generation unit 201) generates the flight schedule information as illustrated in FIG. 5 (step S11).

Next, terminal 20 (schedule transmission unit 202) transmits the generated flight schedule information to server apparatus 10 (step S12). Server apparatus 10 (schedule obtainment unit 101) obtains the flight schedule information transmitted from terminal 20 (step S13). Next, server apparatus 10 (airspace/period tentative determination unit 102) tentatively determines the airspace (step S21) and the permitted flight period (step S22) based on the obtained flight schedule information.

Next, server apparatus 10 (formation flight determination unit 103) performs determination relating to the above-described formation flight (determination of whether or not formation flight is needed, the combination of formation flight, and the arrangement of formation flight) for drones 30 to which the same airspace has been allocated (step S23). Next, server apparatus (formation flight determination unit 103) determines whether or not the above-described function deficiency, near miss, and target expansion will occur (step S24), and if it is determined that they will occur (YES), the processing returns to step S21 and the operation is performed.

If it was determined in step S24 that they will not occur (NO), server apparatus 10 (formation flight determination unit 103) confirms that the tentatively determined airspace and permitted flight period are official (step S25). Next, server apparatus 10 (instruction generation unit 104) generates a flight instruction such as that shown in FIG. 10 (step S31). Next, server apparatus 10 (instruction transmission unit 105) transmits the generated flight instruction to terminal 20 (step S32). Terminal 20 (instruction obtainment unit 203) obtains the transmitted flight instruction (step S33).

Next, terminal 20 (control information generation unit 204) generates the flight control information as illustrated in FIG. 11 based on the obtained flight instruction (step S34). Terminal 20 (control information transmission unit 205) transmits the generated flight control information to the target drone 30 (step S35). Drone 30 (control information obtainment unit 301) obtains the transmitted flight control information (step S36). Drone 30 carries out the above-described flight control processing based on the obtained flight control information (step S40).

If it is expected that drones 30 flying in the same direction in the same airspace will come closer than a predetermined distance to each other as described above, it is conceivable that the danger of collision is eliminated by allocating separate airspaces to those drones 30, but upon doing so, a number of airspaces equal to the number of drones 30 will be needed. In the present embodiment, in this case, the airspaces are shared under the condition that formation flight is performed, and therefore the airspaces can be used more effectively compared to the case of using separate airspaces.

Also, since formation flight is performed, that is, flight is performed while controlling the distances between drones instead of simply sharing the airspace, for example, even if frontward drone 30 decelerates for some reason, rearward drones 30 also decelerate accordingly, and thus collision is avoided. In this manner, in the present embodiment, even if it is expected that aerial vehicles that fly in the same direction will approach each other, airspace can be used safely and effectively.

2. Variations

The above-described embodiment is merely one example for carrying out the present invention, and the following variations are possible as well.

In the embodiment, allocation unit 106 allocated the airspace using cubic cells, but the airspace may be allocated using a different method. For example, allocation unit 106 may use parallelepiped cells instead of cubic cells, or may arrange cylindrical cells with their axes following the travel direction and use those cells as the airspace. Instead of cells, allocation unit 106 may allocate airspace by expressing points, lines, and planes serving as the boundaries of the airspace through equations and ranges of spatial coordinates.

Additionally, in the embodiment, allocation unit 106 allocates airspace including only cells of a constant height, as indicated in FIG. 6. However, airspace including cells of different heights (airspace including movement in the vertical direction) may be allocated as well. Furthermore, in the embodiment, allocation unit 106 allocates airspace that uses east, west, south, and north as the travel directions. However, airspace that uses other directions (north-northeast, west-southwest, and so on) as travel directions may be allocated, and airspace including angular climbs and descents may be allocated as well. In sum, allocation unit 106 may allocate any airspace as the airspace as long as it is airspace in which drone 30 can fly.

Although allocation unit 106 allocated airspaces of a constant size in the embodiment, the size may also be changed. For example, allocation unit 106 may also increase the size of a cross-section of airspace the greater the number of drones 30 that perform formation flight is. The cross-section of the airspace in this context means a cross-section obtained using a plane orthogonal to the travel direction of drones 30 that fly through the center of the airspace.

Figure 13:
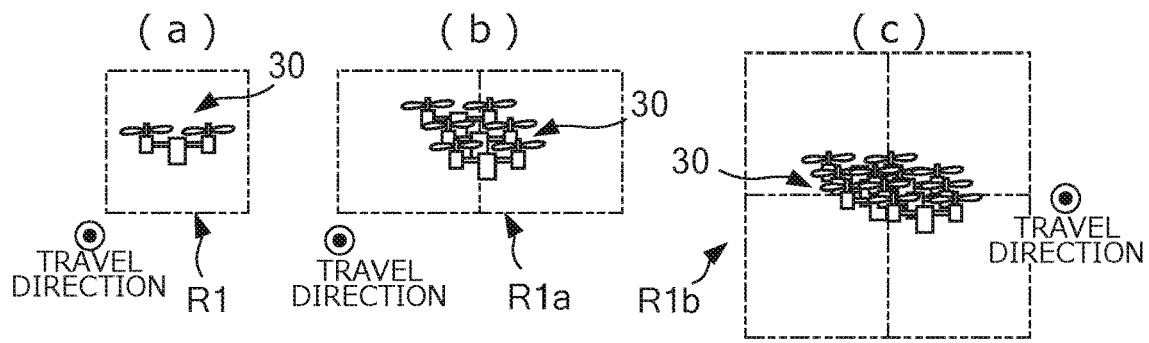
FIG. 13 is a diagram showing an example of an airspace that is allocated in a variation, in accordance to the present invention.

FIG. 13 shows an example of an airspace allocated in the present embodiment. If there is one drone 30 or there are two drones subjected to formation flight, allocation unit 106 allocates airspace R1 in which only one cell is aligned in the travel direction, as shown in FIG. 13(*a*). Also, if there are three to four drones subjected to formation flight, allocation unit 106 allocates airspace R1*a* in which two cells are aligned in the travel direction as shown in FIG. 13(*b*), and if there are five or more drones subjected to formation flight, allocation unit 106 allocates airspace R1*b* in which four cells are aligned in the travel direction as shown in FIG. 13(*c*).

In this manner, in the example shown in FIG. 13, allocation unit 106 has allocated an airspace in which at least a number of cells that is less than the number of drones 30 that are subjected to formation flight are aligned in the travel direction. Accordingly, the airspace can be used more efficiently than in the case of allocating separate airspaces to drones 30. Also, drone 30 that is in flight does not necessarily always proceed linearly, and slight shaking may occur vertically and laterally due to the influence of the wind and the like.

When performing formation flight, the distance from front drone 30 is to be kept within a predetermined range, and therefore if front drone 30 changes position vertically or laterally, rear drone 30 also changes position in the same direction. If several drones 30 perform this movement, drones 30 will align in a wave shape instead of linearly, and when viewed in the travel direction, drones 30 will disperse vertically and laterally as shown in FIGS. 13(b) and 13(c).

This dispersion will increase as the number of drones increases, and therefore if the airspace is narrow, drones will be more likely to protrude from the airspace. In the present variation, the size of the cross-section of the airspace increases the greater the number of drones is, and therefore those drones 30 can be made less likely to protrude from the airspace even if vertical and lateral movement occurs in drone 30 that is performing formation flight, compared to the case of not increasing the size of the cross-section.

Note that the method for changing the size of the cross-section is not limited to the example shown in FIG. 13. The number of drones that is to serve as a reference for when increasing the size may also be changed, and the size of the cross-section may also be a factor of 1.5 or the like instead of a factor of a convenient number such as 2 or 4. Also, the same may also be changed as the size is increased, as in the example shown in FIG. 13(b). In any case, drones 30 can be made less likely to protrude from the airspace by increasing the size of the cross-section of the airspace.

Distance measurement unit 307 of drone 30 may also measure the distances between drone 30 and other drones 30 using a method different from that used in the embodiment. For example, if drone 30 includes an image capture apparatus, distance measurement unit 307 of that drone 30 may also store dimension information indicating the dimensions of drone 30 that flies in front of or behind that drone 30 in advance, recognize drone 30 that appears in the captured image, and measure the distance based on the relationship between the dimensions in the image and the actual dimensions.

Also, if drone 30 includes a sensor that receives electromagnetic waves and measures reception strength, distance measurement unit 307 of that drone 30 may also measure the distance corresponding to the reception strength of electromagnetic waves (a beacon) emitted periodically by another drone 30, as the distance between drone 30 and that drone 30. Also, if drones 30 include a function of being able to communicate with each other, distance measurement unit 307 may also receive position information from other drone 30, and measure the distance between the position indicated by that position information and the position measured by position measurement unit 304 of drone 30 as the distance between drone 30 and other drone 30.

Formation flight determination unit 103 may also determine the alignment order of drones 30 that are subjected to formation flight using a method different from that used in the embodiment. For example, formation flight determination unit 103 determines the alignment order according to the flight speeds of drones 30. The flight speed in this context may be the maximum speed of drones 30, or may be a speed set when performing cruise flight (a speed that is a bit lower than the maximum speed). In the embodiment, there was no significant difference in the flight speeds of drones 30, but in the present variation, it is assumed that there are drones 30 with different flight speeds.

In this case, formation flight determination unit 103 obtains flight speed information indicating the flight speeds of drones 30 similarly to the formation flight function in the embodiment. The flight speed information may also be obtained by schedule obtainment unit 101 along with the flight schedule information as in the example shown in FIG. 5, or may be stored in server apparatus 10 and obtained by formation flight determination unit 103. Schedule obtainment unit 101 and formation flight determination unit 103 that obtain the flight speed information are an example of a "speed obtainment unit" of the present invention.

Formation flight determination unit 103 determines an arrangement in which drones are aligned from the front in order starting from the drone with the slowest flight speed indicated by the obtained speed information. When formation flight is performed, it is sufficient to perform control according to which the parent drone flies according to the flight speed of the slowest drone. However, if such control is not performed, it is possible that front drone 30 will fly faster than rear drone 30, and rear drone 30 will not be able to keep up.

Although there is no danger of collision when drones 30 are spaced too far apart from each other, it may be dangerous if, for example, front drone 30 rapidly decelerates for some reason. Even if front drone 30 rapidly decelerates, if formation flight is being performed, rear drone 30 repeatedly measures the distance from front drone 30, and therefore rear drone 30 can reduce its flight speed according to the deceleration of front drone 30, and thus the danger of collision can be suppressed to a low level (for this reason, formation flight is performed).

In comparison, once drones 30 separate from each other, the distance from front drone 30 can no longer be measured. If rear drone 30 follows according to the deceleration of front drone 30 in this state, rear drone 30 will temporarily lose sight of front drone 30, and therefore it is possible that measurement of the distance will take time, resulting in decelerating too late and colliding. In the present embodiment, drones are aligned from the front in order starting from the drone with the slowest flight speed, and therefore drones 30 in formation flight can be made less likely to separate from each other, and the danger of collision resulting from that separation can be reduced, compared to the case of aligning a drone with a fast flight speed in the front.

Also, for example, formation flight determination unit 103 may also measure the alignment order according to the sizes of drones 30. The size in this context is, for example, the sum of the dimension in the horizontal direction and the dimension in the vertical direction of drone 30 when viewed from the front. Note that there is no limitation thereto, and for example, it is also possible to use only the dimension in the horizontal direction or only the dimension in the vertical direction, or the projected area (front-surface projected area) of drone 30 viewed from the front may be used as the size.

In this case, formation flight determination unit 103 obtains size information indicating the sizes of drones 30 similarly to the formation flight function in the embodiment. The size information may also be obtained by schedule obtainment unit 101 along with the flight schedule information as in the example shown in FIG. 5, or may be stored in server apparatus 10 and obtained by formation flight determination unit 103. Schedule obtainment unit 101 and formation flight determination unit 103 that obtain the size information are an example of a "size obtainment unit" of the present invention.

Formation flight determination unit 103 determines positions for aligning drones from the front in order starting from the drone with the largest size indicated by the obtained size information. In the case of performing formation flight, depending on the distance between drones 30, front drone 30 acts as a windbreak, and therefore a phenomenon called a slipstream (or drafting) in which the air resistance of rear drone 30 is lower compared to that of front drone 30 occurs in some cases (note that it is assumed that the influence on the rotor blades can be ignored).

By using this phenomenon, rear drone 30 can fly at the same speed as front drone 30 while suppressing its output compared to the case of flying solo, and therefore battery power consumption can be suppressed. This phenomenon has a greater effect the larger front drone 30 is, and the larger front drone 30 is, the more this phenomenon will occur even when rear drone 30 is far away.

For example, if large-sized drone 30 is placed at the rear end, no drone 30 will use the space in which the effect of the slipstream that occurs behind large-sized drone 30 is the greatest. In the present embodiment, drones are aligned from the front in order starting with the drone with the largest size, and therefore the slipstream can be used more effectively compared to the case of not aligning the drones in that order.

Note that in the embodiment, formation flight determination unit 103 determined an arrangement in which drone 30 that does not have a formation flight function is in front (set as a parent drone) and drone 30 that has a formation flight function follows therebehind (set as a child drone). However, even when drone 30 that does not include a formation flight function is arranged at another position, formation flight can be performed as long as flight control is performed while drones 30 in front of and behind that drone 30 measure distances from drone 30 that does not include a formation flight function.

However, in this case, there is a danger of collision if drone 30 in front of drone 30 that does not include a formation flight function drops its speed for some reason. In view of this, when drone 30 that does not include a formation flight function is set as a parent drone as in the embodiment, as long as that parent drone is arranged at the front, it is possible to make collision less likely to occur in comparison to the case of arranging drone 30 that does not include a formation flight function at another position, even when any drone 30 drops its speed during formation flight.

In the embodiment, formation flight determination unit 103 determined the alignment order in the case of arranging drones 30 linearly along travel direction as the arranged of multiple drones 30 that perform formation flight, but there is no limitation thereto. For example, formation flight determination unit 103 may also determine the gaps between drones 30 in that case. The gaps between drones 30 are preferably as wide as possible, considering safety. However, there is a risk that if the gaps are too wide, it will be difficult to measure distances, and formation flight will be fragmented partway.

For example, if the alignment order is determined according to the flight speed, formation flight determination unit 103 determines an arrangement in which the gaps are wider the greater the flight speed of front drone 30 is. Accordingly, it is possible to make it less likely that fragmentation of formation flight will occur, compared to the case of making the gaps between drones 30 uniform, and thus it is possible to reduce the danger that rear drone 30 will collide when front drone 30 drops its speed for some reason.

Also, if the alignment order is determined according to the size of drones 30, formation flight determination unit 103 determines a configuration in which the gaps are made larger the greater the size of front drone 30 is. Since the slipstream effect is obtained more the greater the size of front drone 30 is even when spaced apart, by making the gap wider according to the size of front drone 30, it is possible to suppress the battery power consumption of rear drone 30 and reduce the danger that drones 30 will collide with each other, compared to the case of making the gaps between drones 30 uniform.

Also, formation flight determination unit 103 may also determine an arrangement in which, for example, drones 30 are aligned linearly and obliquely with respect to the travel direction, or an arrangement in which drones 30 are aligned in two or more rows, instead of an arrangement in which drones 30 are aligned linearly in the travel direction. The two or more rows may be arranged in a horizontal direction, a vertical direction, or an oblique direction. If the drones are arranged in two or more rows, drones 30 at the front need to fly while their positions and distances fall within a predetermined range, and therefore drones 30 at the front are limited to drones that are capable of such flight control.

In the embodiment, there was no significant different in the maximum flight speeds of drones 30, and therefore the flight speed during formation flight was constant. However, if there are also drones 30 with different flight speeds as in the above-described variation, the parent drone of drones 30 that perform formation flight may also perform flight control in which flight is performed at a speed matching that of drone 30 with the lowest flight speed.

When formation flight is performed according to the speed of slowest drone 30 in this manner, allocation unit 106 may also extend the permitted flight period allocated to drones 30 with higher speeds, according to the speed during formation flight. Specifically, airspace/period tentative determination unit 102 of allocation unit 106 re-calculates the airspace passage period, under the premise of flying at the speed used when performing formation flight, and thereby once again tentatively determines the permitted flight period using the method described with reference to FIG. 7 based on the airspace passage period.

In this case, airspace/period tentative determination unit 102 tentatively determines a longer permitted flight period the greater the delay resulting from formation flight is. By officially confirming the permitted flight period tentatively determined in this manner, allocation unit 106 extends the permitted flight period according to the delay resulting from formation flight. Accordingly, it is possible to make is less likely that a situation will occur in which drone 30 that flies slower to match other drones in formation flight cannot pass through the airspace within the permitted flight period (expiration of permitted flight period).

Although the embodiment describes using a rotary wing-type aerial vehicle as an aerial vehicle that carries out autonomous flight, the aerial vehicle is not limited thereto. For example, the aerial vehicle may be a fixed-wing aerial vehicle, or may be a helicopter-type aerial vehicle. Additionally, autonomous flight functionality is not necessary, and for example, a radio-controlled (wirelessly-operated) aerial vehicle, which is operated remotely by an operation manager, may be used, as long as the aerial vehicle can fly in allocated airspace during in allocated permitted flight period.

Note that although it is not necessary that all of the aerial vehicles include the formation flight function as in the embodiment, it is necessary that at least one or more aerial vehicle includes the formation flight function. For example, although the above-described radio-controlled aerial vehicle does not normally include the formation flight function, formation flight can be performed by causing the aerial vehicle to fly in front, and arranging drone 30 that includes the formation flight function behind the aerial vehicle.

The apparatuses implementing the respective functions illustrated in FIG. 4 may be different from those shown in FIG. 4 For example, the functions of server apparatus 10 (e.g., instruction generation unit 104) may be provided in terminal 20, and the functions of terminal 20 (e.g., schedule generation unit 201) may be provided in server apparatus 10. Additionally, each function of server apparatus 10 may be realized by two or more apparatuses. In sum, the drone operation management system may include any number of apparatuses as long as the functions of the drone operation management system as a whole are realized.

The present invention may be understood as information processing apparatuses, namely the server apparatus and terminal 20, an aerial vehicle, namely drone 30, as well as an information processing system, such as the drone operation management system including those apparatuses and the aerial vehicle. The present invention can also be understood as an information processing method for implementing the processing executed by the respective apparatuses, as well as a program for causing a computer that controls the respective apparatuses to function. The program may be provided by being stored in a recording medium such as an optical disk or the like, or may be provided by being downloaded to a computer over a network such as the Internet and being installed so as to be usable on that computer.

The processing sequences, procedures, flowcharts, and the like of the embodiments described in the specification may be carried out in different orders as long as doing so does not create conflict. For example, the methods described in the specification present the elements of a variety of steps in an exemplary order, and the order is not limited to the specific order presented here.

Information and the like that has been input/output may be saved in a specific location (e.g., memory), or may be managed using a management table. The information and the like that has been input/output can be overwritten, updated, or added to. Information and the like that has been output may be deleted. Information and the like that has been input may be transmitted to other apparatuses.

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and so on.

Additionally, software, commands, and so on may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, these hardwired technologies and/or wireless technologies are included in the definition of "transmission medium".

The information, signals, and so on described in the specification may be realized using any of a variety of different techniques. For example, data, instructions, commands, information, signals, bits, symbols, chips, and so on that may be referred to throughout all of the foregoing descriptions may be realized by voltages, currents, electromagnetic waves, magnetic fields or magnetic particles, photo fields or photons, or any desired combination thereof.

The terms "system" and "network" used in the specification can be used interchangeably.

The phrase "based on" used in the specification does not mean "based only on" unless specifically mentioned. In other words, the phrase "based on" means both "based only on" and "based at least on".

In the specification, with respect to configurations that can be realized both as "A and B" and "A or B", a configuration described using one of these phrases may be used as a configuration described by the other of these phrases. For example, if the phrase "A and B" is used, "A or B" may be used as long as implementation is possible without conflicting with the other phrase.

The embodiments described in the specification may be used alone, may be combined, or may be switched according to how the invention is to be carried out. Additionally, notifications of predetermined information (e.g., a notification that "X is true") are not limited to explicit notifications, and may be carried out implicitly (e.g., the notification of the predetermined information is not carried out).

Although the foregoing has described the present invention in detail, it will be clear to one skilled in the art that the present invention is not intended to be limited to the embodiments described in the specification. The present invention may be carried out in modified and altered forms without departing from the essential spirit and scope of the present invention set forth in the appended scope of patent claims. As such, the descriptions in the specification are provided for descriptive purposes only, and are not intended to limit the present invention in any way.

REFERENCE SIGNS LIST

1 Drone operation management system
10 Server apparatus
20 Terminal
30 Drone
101 Schedule obtainment unit
102 Airspace/period tentative determination unit
103 Formation flight determination unit
104 Instruction generation unit
105 Instruction transmission unit
201 Schedule generation unit
202 Schedule transmission unit
203 Instruction obtainment unit
204 Control information generation unit
205 Control information transmission unit
301 Control information obtainment unit
302 Flight unit
303 Flight control unit
304 Position measurement unit
305 Altitude measurement unit
306 Direction measurement unit
307 Distance measurement unit

What is claimed is:

1. An information processing apparatus comprising:
a processor configured to:
obtain schedule information indicating a flight schedule of each of a plurality of aerial vehicles;

determine an arrangement of the plurality of aerial vehicles to perform a formation flight based on the obtained schedule information if there is a predetermined commonality in airspace and flight direction for each of the plurality of aerial vehicles, wherein the arrangement to perform the formation flight includes a common direction and a position of each of the plurality of aerial vehicles and a range of distance between each of the other aerial vehicles; and allocate an airspace to each of the aerial vehicles based on the determined arrangement to perform the formation flight.

2. The information processing apparatus according to claim 1, wherein the processor is further configured to:
allocate the airspace and a permitted flight period during which flight in the airspace is allowed, and
if aerial vehicles that are to perform formation flight are to fly at a speed matching a speed of an aerial vehicle with the slowest flight speed, extend the permitted flight period according to a delay that results from the formation flight.

3. The information processing apparatus according to claim 1, wherein the processor is further configured to:
determine an arrangement in which the plurality of aerial vehicles are aligned in an order in which the aerial vehicles withdraw from the formation flight.

4. The information processing apparatus according to claim 3, wherein the processor is further configured to:
obtain size information indicating the size of each of the plurality of the aerial vehicles, and
determine an arrangement in which the plurality of aerial vehicles are aligned from the front in order starting from the aerial vehicle with the largest size indicated by the obtained size information.

5. The information processing apparatus according to claim 3, wherein the processor is further configured to:
allocate the airspace and a permitted flight period during which flight in the airspace is allowed, and
if aerial vehicles that are to perform formation flight are to fly at a speed matching a speed of an aerial vehicle with the slowest flight speed, extend the permitted flight period according to a delay that results from the formation flight.

6. The information processing apparatus according to claim 3, wherein the processor is further configured to:
obtain speed information indicating a flight speed of each of the plurality of the aerial vehicles, and
determine an arrangement in which the plurality of aerial vehicles are aligned from the front in order starting from the aerial vehicle with the slowest flight speed indicated by the obtained speed information.

7. The information processing apparatus according to claim 6, wherein the processor is further configured to:
obtain size information indicating the size of each of the plurality of the aerial vehicles, and
determine an arrangement in which the plurality of aerial vehicles are aligned from the front in order starting from the aerial vehicle with the largest size indicated by the obtained size information.

8. The information processing apparatus according to claim 6, wherein the processor is further configured to:
allocate the airspace and a permitted flight period during which flight in the airspace is allowed, and
if aerial vehicles that are to perform formation flight are to fly at a speed matching a speed of an aerial vehicle with the slowest flight speed, extend the permitted flight period according to a delay that results from the formation flight.

9. The information processing apparatus according to claim 1, wherein the processor is further configured to:
obtain speed information indicating a flight speed of each of the plurality of the aerial vehicles, and
determine an arrangement in which the plurality of aerial vehicles are aligned from the front in order starting from the aerial vehicle with the slowest flight speed indicated by the obtained speed information.

10. The information processing apparatus according to claim 1, wherein the processor is further configured to:
obtain size information indicating the size of each of the plurality of the aerial vehicles, and
determine an arrangement in which the plurality of aerial vehicles are aligned from the front in order starting from the aerial vehicle with the largest size indicated by the obtained size information.

11. The information processing apparatus according to claim 1 wherein the processor is further configured to:
allocate the airspace and a permitted flight period during which flight in the airspace is allowed, and
if aerial vehicles that are to perform formation flight are to fly at a speed matching a speed of an aerial vehicle with the slowest flight speed, extend the permitted flight period according to a delay that results from the formation flight.

12. The information processing apparatus according to claim 1, wherein the processor is further configured to:
increase the size of a cross-section of the airspace the greater the number of aerial vehicles that are to perform the formation flight is.

13. The information processing apparatus according to claim 12, wherein the processor is further configured to:
allocate the airspace and a permitted flight period during which flight in the airspace is allowed, and
if aerial vehicles that are to perform formation flight are to fly at a speed matching a speed of an aerial vehicle with the slowest flight speed, extend the permitted flight period according to a delay that results from the formation flight.

14. The information processing apparatus according to claim 1, wherein the processor is further configured to:
obtain function information indicating whether or not an aerial vehicle includes a function of performing formation flight, and
wherein based on the obtained function information, determine an arrangement in which an aerial vehicle that does not include the function is in front and an aerial vehicle that includes the function follows therebehind.

15. The information processing apparatus according to claim 14, wherein the processor is further configured to:
determine an arrangement in which the plurality of aerial vehicles are aligned in an order in which the aerial vehicles withdraw from the formation flight.

16. The information processing apparatus according to claim 14, wherein the processor is further configured to:
obtain speed information indicating a flight speed of each of the plurality of the aerial vehicles, and
determine an arrangement in which the plurality of aerial vehicles are aligned from the front in order starting from the aerial vehicle with the slowest flight speed indicated by the obtained speed information.

17. The information processing apparatus according to claim 14, wherein the processor is further configured to:

obtain size information indicating the size of each of the plurality of the aerial vehicles, determine an arrangement in which the plurality of aerial vehicles are aligned from the front in order starting from the aerial vehicle with the largest size indicated by the obtained size information.

18. The information processing apparatus according to claim 14, wherein the processor is further configured to:

allocate the airspace and a permitted flight period during which flight in the airspace is allowed, and if aerial vehicles that are to perform formation flight are to fly at a speed matching a speed of an aerial vehicle with the slowest flight speed, extend the permitted flight period according to a delay that results from the formation flight.

\* \* \* \* \*